(12) United States Patent
Matsumoto

(10) Patent No.: US 8,014,584 B2
(45) Date of Patent: Sep. 6, 2011

(54) PATTERN DIMENSION MEASURING APPARATUS AND PATTERN AREA MEASURING METHOD

(75) Inventor: Jun Matsumoto, Tokyo (JP)

(73) Assignee: Advantest Corp., Tokyo (JP)

( * ) Notice: Subject to any disclaimer, the term of this patent is extended or adjusted under 35 U.S.C. 154(b) by 1005 days.

(21) Appl. No.: 11/903,083

(22) Filed: Sep. 20, 2007

(65) Prior Publication Data

US 2008/0069452 A1    Mar. 20, 2008

Related U.S. Application Data

(63) Continuation of application No. PCT/JP2007/064082, filed on Jul. 17, 2007.

(30) Foreign Application Priority Data

Sep. 14, 2006  (JP) .................... PCT/JP2006/318287

(51) Int. Cl.
   *G06K 9/00*   (2006.01)
(52) U.S. Cl. ...................................... 382/141
(58) Field of Classification Search .......... 382/141–152, 382/206, 286
   See application file for complete search history.

(56) References Cited

U.S. PATENT DOCUMENTS

| | | | | |
|---|---|---|---|---|
| 5,986,263 A * | 11/1999 | Hiroi et al. | .................... | 250/310 |
| 6,480,807 B1 * | 11/2002 | Miyano | ........................ | 702/159 |
| 6,724,947 B1 | 4/2004 | Hayes | | |
| 6,845,497 B2 * | 1/2005 | Murai et al. | .................... | 430/30 |
| 6,909,791 B2 * | 6/2005 | Nikitin et al. | ................. | 382/108 |

FOREIGN PATENT DOCUMENTS

| | | |
|---|---|---|
| JP | 63-021844 | 1/1988 |
| JP | 05-296754 | 11/1993 |
| JP | 07-027548 | 1/1995 |
| JP | 2001-91231 | 4/2001 |
| JP | 2003-033845 | 2/2003 |
| JP | 2005-322709 | 11/2005 |

* cited by examiner

*Primary Examiner* — Phuoc Tran
*Assistant Examiner* — Alex Liew
(74) *Attorney, Agent, or Firm* — Muramatsu & Associates

(57) ABSTRACT

A pattern area measuring method includes the steps of: acquiring image data of a pattern; dividing the pattern into partial patterns; calculating the areas of the partial patterns; and calculating the area of the pattern by summing up the areas of the partial patterns. The step of dividing the pattern into partial patterns may further include the steps of: dividing the pattern into fan-shaped partial patterns each having a central angle of a predetermined value; calculating the line profile on a line intersecting the center of the pattern and an edge of the pattern for each of the partial patterns; creating a differential profile; and detecting an edge position of the partial pattern by use of the line profile and the differential profile and then deriving a radius from the center position and the edge position.

6 Claims, 20 Drawing Sheets

FIG. 5C

PATTERN DIMENSION MEASURING APPARATUS AND PATTERN AREA MEASURING METHOD

CROSS-REFERENCE TO RELATED APPLICATIONS

This is a continuation of International Application No. PCT/JP2007/064082, filed Jul. 17, 2007, which is herein incorporated by reference.

BACKGROUND OF THE INVENTION

1. Field of the Invention

The present invention relates to a device and a method of pattern dimension measurement using an electron beam. More specifically, the present invention relates to a pattern dimension measuring apparatus and a pattern area measuring method capable of measuring an area of a contact hole or the like with high reproducibility and accuracy.

2. Description of the Prior Art

Measurement with a scanning electron microscope has been practiced as a method of measuring a pattern line width. A typical scanning electron microscope is configured to irradiate an electron scanning range with incident electrons in a scanning manner, then to acquire secondary electrons that are emitted from a sample via a scintillator, then to acquire image data by converting the quantity of the acquired electrons into luminance, and then to display the image data on a display device.

When characteristics of a semiconductor device are managed by using such a scanning electron microscope, it is a general practice to check whether or not a line width of a line pattern and an area of a contact hole or the like are formed within design standards. The pattern line width and the area are managed in accordance with the following procedures. After a given range of a pattern formed on a photomask is displayed on a screen, an electron beam is focused and irradiated on a measurement point within the displayed range, and thus a waveform representing luminance distribution is acquired based on secondary electrons that are reflected from the measurement point. Then, the luminance distribution waveform is analyzed to find a pattern edge position and to define a line width.

Meanwhile, an area of a contact hole is calculated based on a value of acquired image data. A judgment is made as to whether or not this line width or the area is within an allowable range of error. The line width and area thus judged are used as criteria for quality judgment of the photomask or as process feedback information for a preprocess.

As described above, the measurement of a line width and an area of a pattern is important for a manufacturing process of a photomask. Therefore, various methods of measuring the line width and the area have been proposed to date.

In general, a position where an inclination of luminance corresponding to the quantity of secondary electrons becomes the largest is defined as an edge position of a pattern. In contrast, Japanese Unexamined Patent Publication No. Hei 5 (1993)-296754 discloses an edge detection method of defining, as an edge position, a position where a secondary electron signal becomes the smallest value.

Meanwhile, Japanese Patent Application Laid-open Publication No. 2003-33845 discloses a method of accurately detecting a position of an alignment mark provided on a wafer by capturing an image of the alignment mark with a CCD (charge-coupled device) camera and by performing edge extraction from the captured image.

As described above, the measurement of the pattern line width with use of a scanning electron microscope generally employs the method of defining, as an edge position, a position where an inclination of luminance becomes the maximum or the method of defining, as an edge position, a position where a secondary electron signal becomes the minimum.

On the other hand, the area of the contact hole or the like has been calculated based on luminance information on pixels constituting a SEM image. Specifically, pixels having greater values or smaller values of luminance than a predetermined reference value are extracted from the SEM image, so that the area is calculated by summing up the number of pixels.

In general, the luminance information in the SEM image varies depending on the material, a film thickness or a pattern shape of a measurement object, and also depending on instrument parameters such as an accelerating voltage of an electron beam or the number of scanning operations. Moreover, the luminance information on each pixel contains noise components. Accordingly, the area may be inaccurate when calculated by counting the pixels extracted from the pixel-based luminance information by use of a predetermined luminance threshold.

For example, FIG. 1 is a view showing a portion L of an edge of a contact hole illustrated on pixel-based coordinates P. Pixels shaded in FIG. 1 show smaller luminance values than a predetermined reference value, and these pixels are used for calculating the area of the contact hole. As shown in FIG. 1, the pixels having a predetermined size cannot indicate the edge precisely. For example, a pixel SP2 in FIG. 1 contains portions inside and outside the contact hole. Accordingly, the area value is inaccurate if the pixel SP2 is included in the area of the contact hole.

Moreover, the luminance information represented by these pixels contains noise components. Accordingly, the luminance information is unstable if a S/N ratio is low, and thereby reproducibility of the area value is poor because the pixels selected near the edge may be different in each measurement. For example, a luminance data value for a pixel NP2 may be greater than a predetermined reference value in a certain measurement while being smaller than the predetermined reference value in another measurement.

SUMMARY OF THE INVENTION

The present invention has been made in view of the foregoing problem of the prior art. An object of the present invention is to provide a pattern dimension measuring apparatus and a pattern area measuring method capable of measuring an area of a pattern reproducibly and accurately.

The aforementioned problem will be solved by a pattern dimension measuring apparatus including: a unit for irradiating an electron beam onto a sample in a scanning manner; a unit for, acquiring image data of a pattern according to the quantity of electrons emitted, by irradiation of the electron beam, from a surface of the sample where the pattern is formed; and an area measuring unit for dividing the pattern into multiple partial patterns, calculating the areas of the partial patterns, and calculating the area of the pattern by summing up the areas of the partial patterns.

The pattern dimension measuring apparatus of this aspect may further include: a line profile creating unit for creating a line profile to represent a luminance signal on a predetermined line out of the image data; and a differential profile creating unit for creating a differential profile by differentiating the line profile. Here, the area measuring unit may operate: to divide the pattern into the fan-shaped partial patterns each having a central angle of a predetermined value; to detect an edge position for each of the partial patterns by use of the center of the pattern and the line profile as well as the differential profile on a line intersecting an edge of the pattern; to calculate the area of each of the partial patterns by deriving a radius from the center position and the edge position; and to calculate the area of the pattern by summing up the areas of the partial patterns. The line profile creating unit may operate to create the line profile on the line by averaging a predetermined number of pixel data, and the center of the pattern may be calculated on the basis of the width of the pattern in the X direction and the width of the pattern in the Y direction.

In addition, in the pattern dimension measuring apparatus of this aspect, when the pattern is a rectangular pattern surrounded by opposed first and second edges, the area measuring unit may divide the rectangular pattern into rectangular partial patterns by sectioning the opposed first edges into parts of a predetermined length; calculate the distance between the opposed first edges, for each of the rectangular partial patterns, by use of the line profile and the differential profile on a line being parallel to the opposed second edges and intersecting the opposed first edges; calculate the area of each of the rectangular partial patterns by multiplying the predetermined length and the distance; and calculate the area of the rectangular pattern by summing up the areas of the rectangular partial patterns.

According to the present invention, when measuring the area of the pattern, the pattern is divided into a predetermined number of the partial patterns, then the area is measured for each of the partial patterns, and then the area of the pattern is calculated by summing up the areas of the partial patterns. When measuring the area of the partial pattern, the line profile on the line connecting the central position and the edge is obtained, then the edge position is calculated by use of the obtained line profile, and then the radius is obtained by use of the central position and the edge position. When obtaining the line profile, the line profile is calculated by averaging luminance data for multiple pixels. Then, calculated is the area of the fan shape having the obtained edge position as the intersection of radius and arc. In this way, even when the luminance signals for the pixels contain noises; the edge position is detected, and the area is calculated, by use of the noise-reduced values. Accordingly, it is possible to calculate the area with high reproducibility.

In the pattern dimension measuring apparatus of this aspect, the area measuring unit may detect edge positions around the pattern at a predetermined interval; and calculate the area of the pattern by subtracting a total area of trapezoidal regions each being defined by two detected edge positions adjacent to each other and excluding partial patterns obtained by dividing the pattern, from a total area of trapezoidal regions each being defined by the two detected edge positions adjacent to each other and including the partial patterns. The pattern dimension measuring apparatus may further include a line profile creating unit for creating a line profile to represent a luminance signal on a predetermined line out of the image data, and a differential profile creating unit for creating a differential profile by differentiating the line profile. Here, the area measuring unit may detect the edge positions around the pattern at the predetermined interval as follows. Firstly, a first edge position of the pattern is detected and defined as a starting-point edge position. Next, a second edge position at a predetermined distance away from the starting-point edge position is detected and defined as a temporary edge position. After that, a third edge position is detected by use of the line profile and the differential profile on a line perpendicularly passing the middle point on a segment connecting the starting-point edge position and the temporary edge position. Thereafter, a new edge position adjacent to the third edge position is detected while defining the third edge position as the new starting-point edge position.

According to the present invention, when measuring the area of the pattern, the edge positions around the pattern are automatically detected by designating one point in the pattern, and the area of the pattern is calculated by using the trapezoidal rule according to the detected edge positions. In this way, it is possible to reduce a burden of user for specifying a target range and to prevent deterioration in measurement accuracy due to erroneous range specification.

Meanwhile, when detecting the edges around the pattern, the subsequent edge positions are detected by use of the line profile on the line which is orthogonal in the intermediate position to the straight line connecting the detected edge position and the temporary edge position located at the predetermined interval. In this way, the edges can be detected on the line which is substantially perpendicular to the contour of the pattern. Accordingly, it is possible to detect the edge positions accurately and thereby to calculate the area of the pattern accurately.

Another aspect of the present invention is a pattern area measuring method to be carried out by the pattern dimension measuring apparatus of the above-described aspect. According to the pattern area measuring method, the pattern dimension measuring apparatus includes: a unit for irradiating an electron beam onto a sample in a scanning manner; a unit for acquiring image data of the pattern according to the quantity of electrons emitted, by irradiation of the electron beam, from the surface of the sample where the pattern is formed; a line profile creating unit for creating a line profile to represent a luminance signal on a predetermined line out of the image data; and a differential profile creating unit for creating a differential profile by differentiating the line profile. The pattern area measuring method includes the steps of: acquiring an image of a pattern in a measurement target range; dividing the pattern into multiple partial patterns; calculating the areas of the partial patterns; and calculating the area of the pattern by summing up the areas of the partial patterns.

In the pattern area measuring method of this aspect, the step of dividing the pattern into multiple partial patterns may further include the steps of: dividing the pattern into the fan-shaped partial patterns each having a central angle of a predetermined value; creating a line profile on a line intersecting the center of the pattern and an edge of the pattern for each of the partial patterns; creating the differential profile by differentiating the line profile; and detecting an edge position of the partial pattern by use of the line profile and the differential profile, and then deriving a radius from the center position and the edge position. When the pattern is a rectangular pattern surrounded by opposed first and second edges, the step of dividing the pattern into multiple partial patterns may further include the steps of: dividing the rectangular pattern into rectangular partial patterns by sectioning the opposed first edges into a predetermined length; creating the line profile on a line being parallel to the opposed second edges and intersecting the opposed first edges for each of the rectangular partial patterns; creating the differential profile by differentiating the line profile; and calculating the distance between the first edges by detecting the position of the first edges in each of the partial patterns by use of the line profile and the differential profile. Alternatively, the step of dividing the pattern into multiple partial patterns may include the steps of: detecting and defining an edge position of the pattern as a starting-point edge position, and detecting and defining an edge position at a predetermined distance away from the starting-point edge position as a temporary edge position; creating the line profile on a line perpendicularly passing the middle point on a segment connecting the starting-point edge position and the temporary edge position; creating the differential profile by differentiating the line profile, detecting a third edge position by use of the line profile and the differential profile; detecting edge positions around the pattern by defining the third edge position as the new starting-point position, and by detecting a new edge position adjacent to the third edge position; and dividing the pattern into trapezoidal regions each defined by the two edge positions adjacent to each other and including partial patterns obtained by dividing the pattern. Here, the step of calculating the area of the pattern may be the step of subtracting a total area of trapezoidal regions excluding the partial patterns from a total area of the trapezoidal regions including the partial patterns.

BRIEF DESCRIPTION OF THE DRAWINGS

FIGS. 5A to 5C are first views for explaining edge detection of the contact hole.

DESCRIPTION OF THE PREFERRED EMBODIMENTS

Now, preferred embodiments of the present invention will be described below with reference to the accompanying drawings.

(1) First Embodiment

First, a configuration of a scanning electron microscope used as a pattern dimension measuring apparatus will be described. Second, a general method of measuring a line width of a pattern will be described. Third, area measurement of a contact hole as an example of a pattern will be described. Fourth, an application of a pattern area measuring method will be described.

(Configuration of Scanning Electron Microscope)

Figure 1:
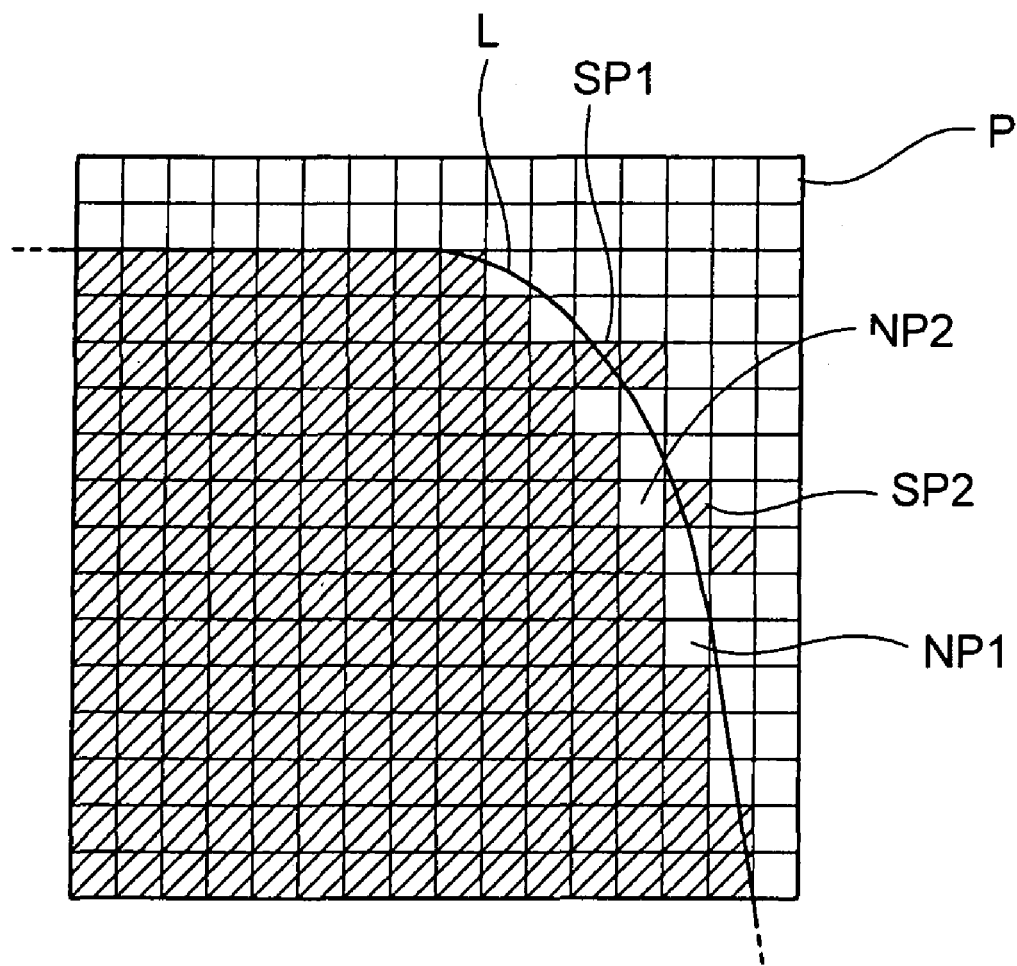
FIG. 1 is a view for explaining a problem of conventional area measurement.
Figure 2:
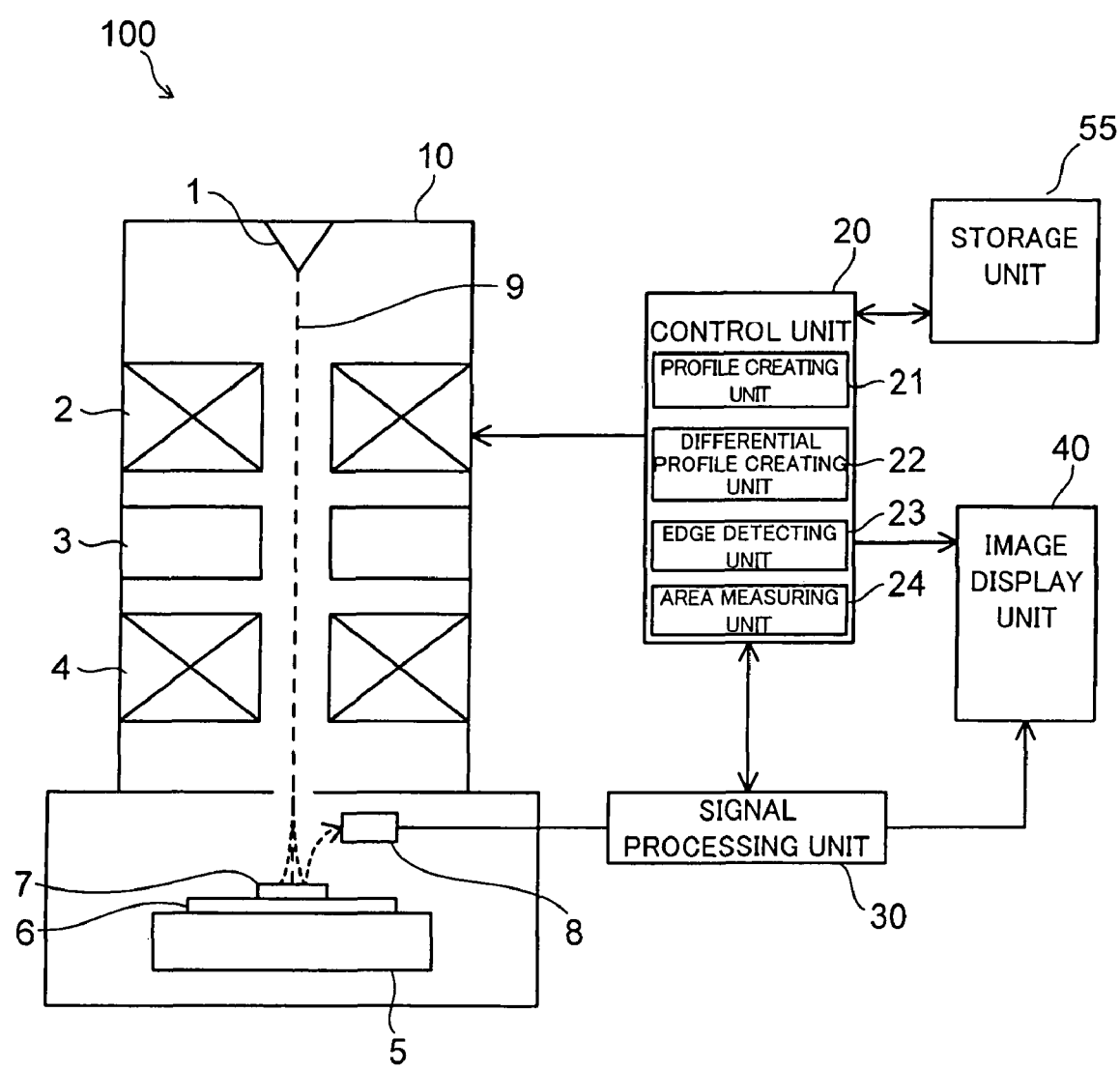
FIG. 2 is a block diagram of a scanning electron microscope used in an embodiment of the present invention.

FIG. 2 is a block diagram of a scanning electron microscope according to an embodiment of the present invention.

This scanning electron microscope 100 essentially includes an electron scanning unit 10, a signal processing unit 30, an image display unit 40, a storage unit 55, and a control unit 20 for controlling the electron scanning unit 10, the signal processing unit 30, the image display unit 40 and the storage unit 55. The control unit 20 includes a profile creating unit 21, a differential profile creating unit 22, an edge detecting unit 23, and an area measuring unit 24.

The electron scanning unit 10 includes an electron gun 1, a condenser lens 2, a deflecting coil 3, an objective lens 4, a motion stage 5, and a sample holder 6.

Charged particles 9 emitted from the electron gun 1 are passed through the condenser lens 2, the deflecting coil 3, and the objective lens 4 and are irradiated on a sample 7 on the motion stage 5.

The charged particles 9 (a primary electron beam) are irradiated on the sample 7 in a two-dimensionally scanning manner, and secondary electrons emitted from an irradiated region are detected by an electron detector 8 formed of a scintillator and the like. Detected quantity of secondary electrons is converted into a digital amount by an AD converter in the signal processing unit 30 and is stored in the storage unit 55 as image data. The image data are converted into luminance signals and are displayed on the image display unit 40. The image data are arranged on a two-dimensional array so as to form the same layout as scanning positions of the primary electron beam on the sample 7, thereby obtaining a two-dimensional digital image. Each pixel in this two-dimensional digital image represents luminance data expressed by 8 bits.

An electron deflection amount of the deflector coil 3 and an image scanning amount of the image display unit 40 are controlled by the control unit 20. Moreover, a program for executing line width measurement is stored in the control unit 20.

The profile creating unit 21 creates a line profile that represents the luminance signal of scanning electron microscopic (SEM) image data in a specified range. The line profile represents the luminance signal corresponding to the amount of secondary electrons, which is considered to reflect a cross-sectional shape of a measured pattern.

The differential profile creating unit 22 performs a primary differentiation process on the line profile to create a primary differential profile.

The edge detecting unit 23 detects edges by use of the line profile and the primary differential profile.

The area measuring unit 24 measures an area of a specified pattern targeted for measurement. The area is calculated in the unit of pixels constituting the image data, and the actual area is calculated by conversion using a relation between a predetermined pixel width and an actual length.

(General Method of Measuring Line Width of Pattern)

Next, description will be made regarding a general method of measuring a line width of a pattern on a sample shown in FIG. 3A by use of the scanning electron microscope 100 shown in FIG. 2.

Figure 3A:
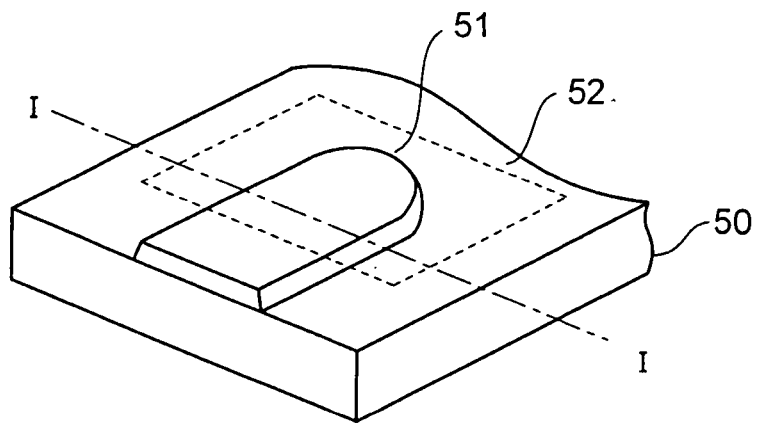
FIGS. 3A to 3D are views for explaining electron images and profiles to be acquired by a signal processing unit.

As shown in FIG. 3A, a photomask substrate 50 including a line pattern 51 formed thereon is used as the sample 7. Part of the sample 7 is formed into a planar shape as shown in FIG. 3A. Here, a section surrounded by a dashed line shows an observation range of the scanning electron microscope 100.

Figure 3B:
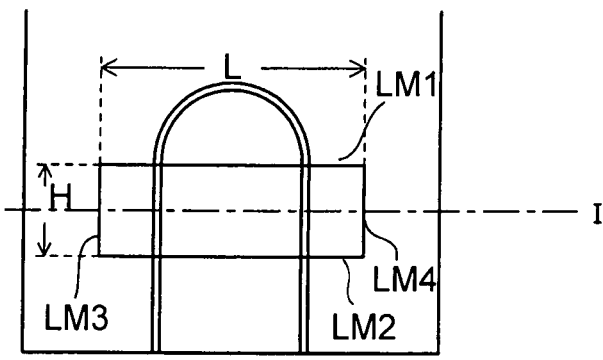

FIG. 3B shows an example of a SEM image obtained by detecting the quantity of electrons such as the secondary electrons emitted as a consequence of scanning the sample shown in FIG. 3A with the electron beam by use of the electron detector 8 and then converting the detected quantity of electrons into the luminance signal, which is displayed while synchronizing the scan by the electron beam with a CRT (cathode ray tube) scan of the display device.

Another SEM image is extracted from the SEM image shown in FIG. 3B by specifying a measurement area. The measurement area is defined as a width H of 400 pixels by a length L, for example. This area is selected by an operator by use of an upper line marker LM1, a lower line marker LM2, a left line marker LM3, and a right line marker LM4.

The extracted SEM image pixel data are divided in the H direction of the measurement area and a line profile corresponding to luminance distribution is obtained for each of the divided regions. When obtaining the line profile, it is possible to reduce noise components by performing a smoothing process in the direction of the length L at a width pitch of 3 pixels, for example.

Figure 3C:
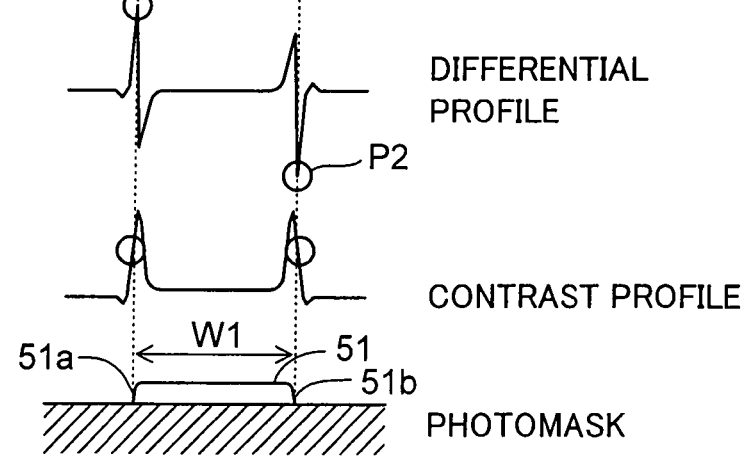

FIG. 3C is a view showing a line profile corresponding to the quantity of the secondary electrons emitted from the sample, which is obtained when irradiating the electron beam along the I-I line in FIG. 3A. As shown in FIG. 3C, the line profile (a contrast profile) drastically changes at the edges of the pattern. In order to find the positions of the drastic changes, the line profile is differentiated to obtain the top peak and the bottom peak of differentiated signal amounts.

Figure 3D:
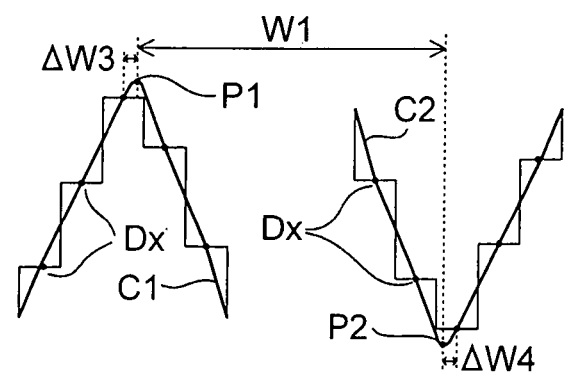

Moreover, as shown in FIG. 3D, differential waveforms C1 and C2 are obtained by interpolating spaces between the pixels while using multiple differential signals Dx before and after the peaks, and peak positions for a first peak P1 and a second peak P2 are calculated at resolving power of 1/100. A width W1 of the line pattern is defined as a distance between the first peak P1 and the second peak P2.

The above-described series of processes are executed for each of the divided regions, and an average value of the widths of the pattern calculated in the respective regions is defined as a length value. In this way, it is possible to obtain the width W1 of the line pattern more accurately.

(Pattern Area Measurement)

In this embodiment, a method of calculating the area of the contact hole will be described as the example of the pattern.

Figure 4A:
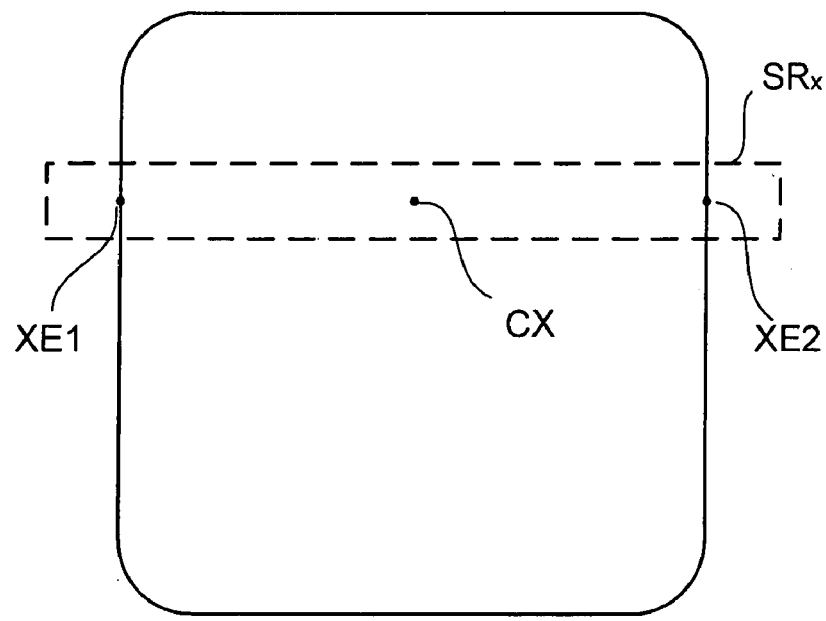
FIGS. 4A and 4B are views for explaining detection of a central position of a contact hole.
Figure 4B:
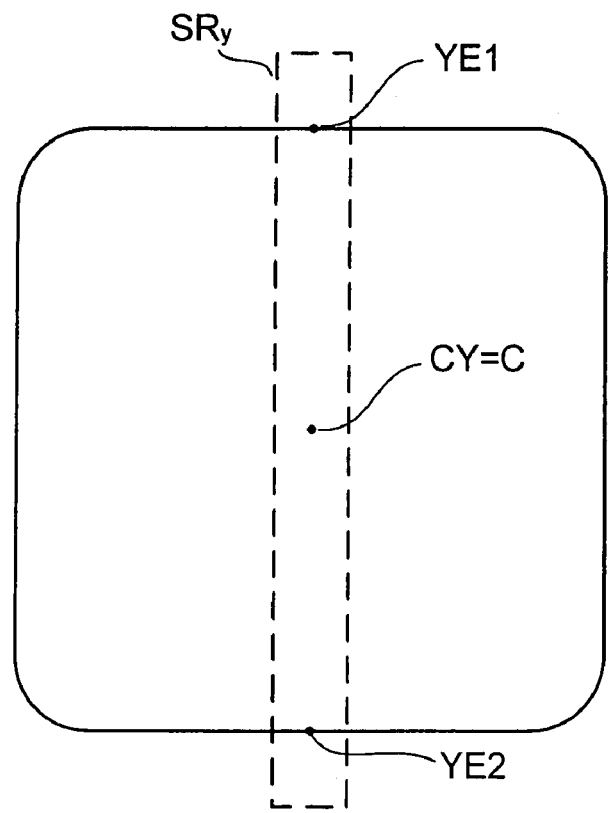

FIGS. 4A and 4B are views showing an example of the contact hole.

In this embodiment, the area of the contact hole is not calculated by judging whether a pixel is located in the range of the contact hole according to whether the luminance data of the pixel is greater or smaller than a reference value. Instead, the area of the contact hole is calculated by dividing the contact hole into a predetermined number of partial patterns (in a fan shape in this embodiment) and summing up the areas of the partial patterns.

For example, when the partial pattern is the fan shape having a central angle of 5 degrees, the areas of 72 fan shapes are calculated and summed up to obtain the area of the contact hole.

The center of the contact hole and a radius are obtained in order to calculate the areas of the partial patterns. Now, detection of the center of the contact hole will be described.

First, a line profile of a specified region is obtained by use of the SEM image data of the contact hole. The specified region is specified by setting a search region SRx so as to include the edges on both sides in the X direction of the contact hole. The two edges (XE1, XE2) in the X direction of the contact hole are obtained from the line profile, and the middle point therebetween is defined as a center Cx in the X direction.

Next, another search region SRy including the center Cx and the edges on both sides in a Y direction is set up, and a line profile of a line in the Y direction passing through the center Cx is obtained. The two edges (YE1, YE2) in the Y direction are obtained from this line profile, and the middle point therebetween is defined as a center Cy in the Y direction. This position is the center C of the contact hole.

Next, the radius of the partial pattern is obtained. This radius is obtained as a distance between the center C and the edge by detecting the position of the edge of the contact hole.

Figure 5A:
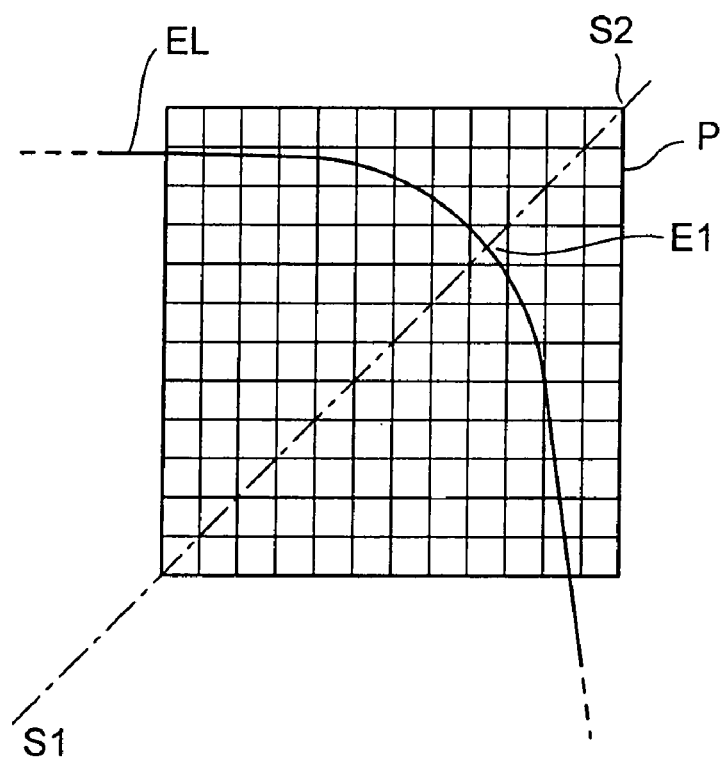

FIG. 5A is a view showing a line representing a luminance signal on pixel-based coordinates P, the luminance signal obtained from the SEM image of an edge portion EL of part of the contact hole.

A region of interest (ROI) is set up so as to include the central position C of the contact hole obtained by the above-described method, and a line intersecting the edge around the contact hole.

Figure 5B:
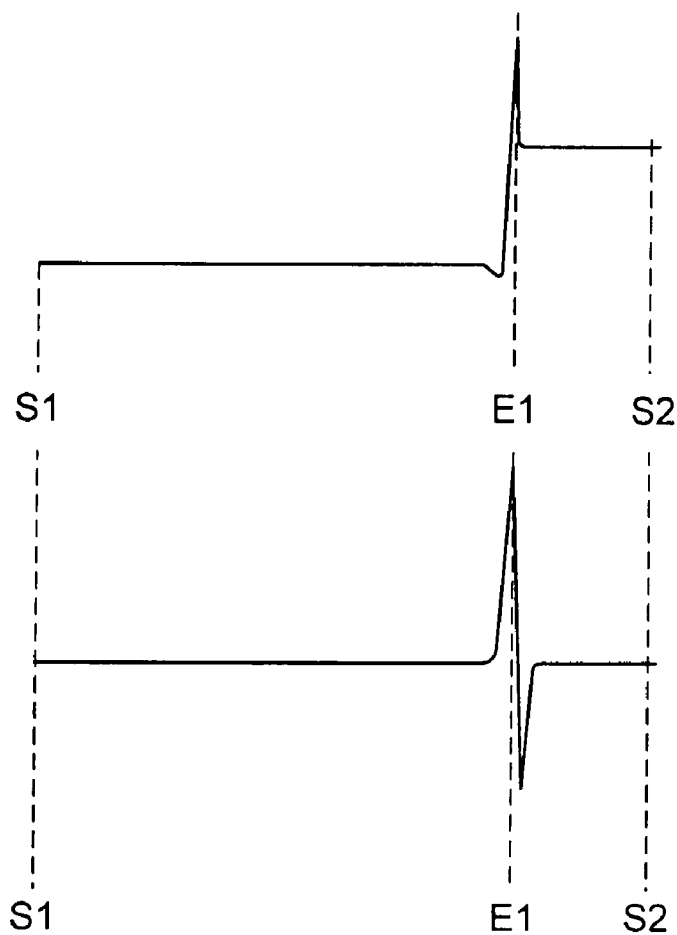

The S1-S2 line in FIG. 5A is a reference line for profile creation. When the line profile is created along this reference line, a signal waveform as shown in FIG. 5B can be obtained, for example. A signal amount value on a side of a point S1 is smaller than a signal amount value on a side of a point S2 in a zone beyond a position of an edge E1, and the signal amount drastically changes at the point E1. Moreover, FIG. 5C shows a result of differentiation of the line profile in FIG. 5B, in which a top peak of a differentiated signal amount is obtained at the point E1, and in which the position of the point E1 is detected as the edge on the S1-S2 line. At this time, spaces between the pixels are interpolated by use of multiple differential signals before and after the peak as similar to the line width measurement, and the peak position is calculated at resolving power of 1/100.

The radius on the S1-S2 line is obtained by calculating the distance between this edge position E1 and the central position C.

Figure 6:
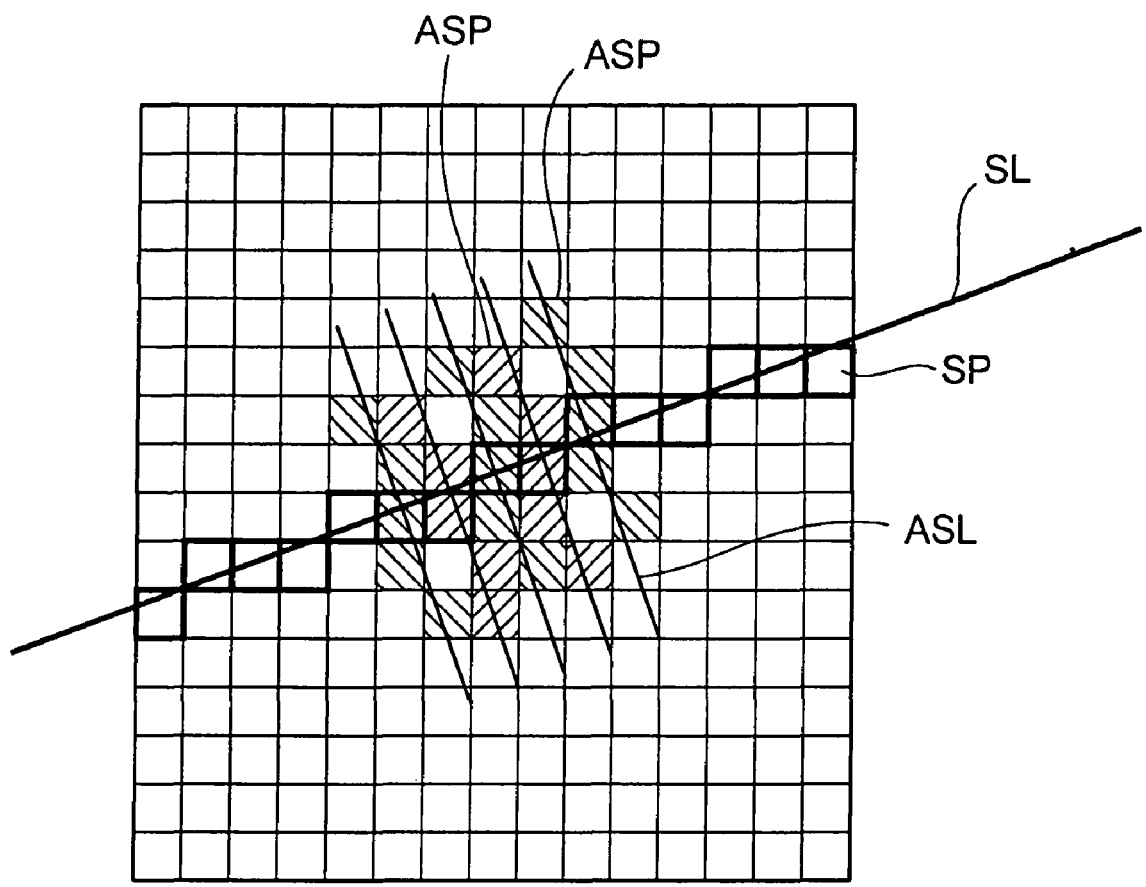
FIG. 6 is a second view for explaining the edge detection of the contact hole.

Next, calculation of the line profile will be described in detail with reference to FIG. 6. A line SL in FIG. 6 is a reference line for profile creation. Meanwhile, each of lines ASL is an averaging reference line for finding the pixels used for obtaining the average luminance value.

Luminance data in a position on the reference line SL of each of the pixels is calculated along the reference line SL for creating the line profile. The luminance of each of the pixels SP corresponding to the reference line SL is calculated as the average value of the luminance data of not only the pixel SP, itself, but also 5 pixels ASP along a corresponding one of the averaging reference lines ASL perpendicular to the reference line SL.

Selection of the pixels applies the X axis to a reference axis when an inclination angle of the reference line SL for profile creation is equal to or below 45 degrees or applies the Y axis to the reference axis when the inclination angle is above 45 degrees. When the X axis is the reference axis, the pixels corresponding to the reference line SL are selected from all X positions while avoiding overlaps in the same X positions. Meanwhile, when the X axis is the reference axis of the reference line SL, the Y axis is the reference axis of the averaging reference lines ASL. Here, the pixels having the centers located closest to the averaging reference lines ASL are selected while avoiding overlaps in the same Y positions. In the case shown in FIG. 6, the Y axis is the reference axis for finding 5 pixels, and the pixels (ASP) having the centers located closest to the reference line are selected while avoiding overlaps in the same Y positions.

The reason for averaging the luminance data of the multiple pixels as described above is that the luminance data of the respective pixels contain noise components at random values, and that the luminance data for one pixel represent different values according to each of the measurement sessions. Accordingly, it is not possible to achieve the reproducible measurement. For this reason, the noises are reduced by averaging the luminance data of the multiple pixels.

Note that the number of pixels for averaging the luminance data is not limited to 5 pixels. It is possible to increase the number of pixels or to decrease the number of pixels in the case of a good S/N ratio.

Next, description will be given of a calculation of the area of the contact hole to be carried out after calculating the areas of the fan shapes of the partial patterns according to the central position of the contact hole and the edge positions.

Figure 7:
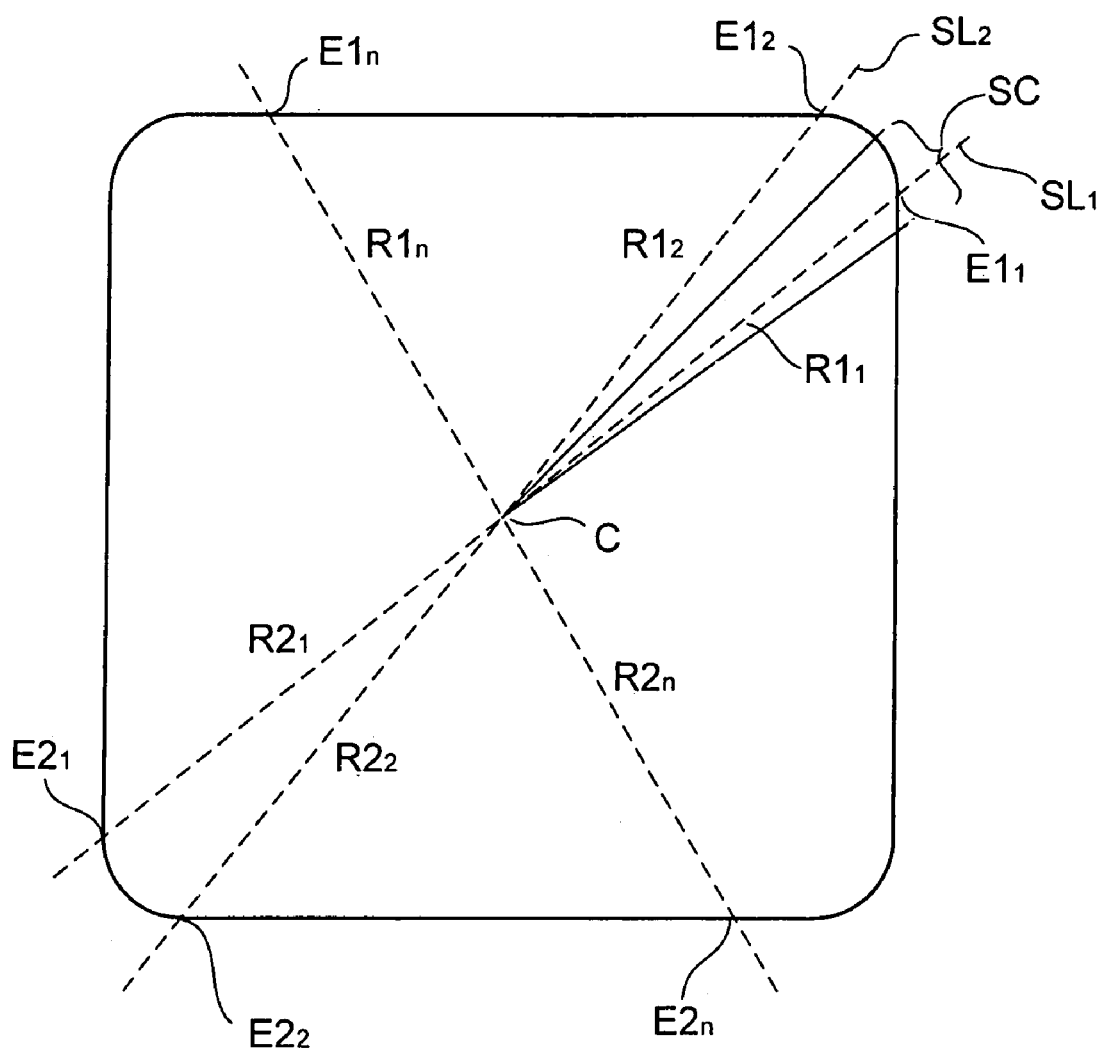
FIG. 7 is a view for explaining calculation of an area of the contact hole.

FIG. 7 is a view for explaining calculation of the entire area of the contact hole.

A radius $R1_1$ is derived from the central position C and an edge position $E1_1$. Then, the area of a fan shape SC (the partial pattern) having a predetermined central angle (such as 5 degrees) is calculated by using the radius $R1_1$. Similarly, with respect to an edge position $E2_1$ located in a diagonal position, a radius $R2_1$ is derived from the edge position $E2_1$, and the area of another fan shape SC having the predetermined central angle is calculated by using the radius $R2_1$. Thereafter, a reference line $SL_1$ for obtaining the line profile is rotated in the amount equivalent to the central angle, and a line profile along a new reference line $SL_2$ is created to detect an edge $E1_2$.

In this way, the edges are detected for each of the predetermined central angle while rotating the reference line, and the areas of the partial patterns are obtained for the entire range of the contact hole.

For example, when the central angle is set equal to 5 degrees, the total area of the contact hole is equal to a sum of $(R1n^2+R2n^2) \times \pi \times 1/72$ where n ranges from 1 to 36.

In the above explanation, the area is calculated on the basis of the number of pixels. Accordingly, the actual value is obtained by conversion using length corresponding to the size of the pixel. For example, when the size of one pixel is defined by X=5.625 nm and Y=5.630 nm, the actual value is calculated by multiplying the area on the pixel basis by 5.625×5.630.

Here, when the partial pattern is not in the fan shape but in a triangle shape having only straight sides, it is also possible to calculate the area of the partial pattern by regarding the partial pattern as the triangle, if desired. Precisely, in this case, the area of the partial pattern can be calculated by use of the central position C, the edge position $E1_1$ and the central angle of 5 degrees.

Hereinafter, description will be given of the reason why it is possible to improve reproducibility and accuracy by detecting the edge positions, calculating the radius of the contact hole, obtaining the areas of the fan shapes, and calculating the area of the contact hole by summing up the areas of the fan shapes.

When the area is calculated in a conventional manner by judging the pixel values, the pixel values near the edges contain noises and have poor S/N ratios. Accordingly, the pixels satisfying the predetermined value are not fixed every time measurement is performed, so that the value of the area changes for each measurement.

In this embodiment, the line profile is created in the direction from the center to the periphery by use of multiple pixel values, and the edge position is detected by differentiating the line profile. By using the multiple pixel values, it is possible to reduce the noises even in the case of the poor S/N ratio. Moreover, the spaces between the pixels are interpolated by the multiple pixel values and calculated at resolving power of 1/100 pixel. Accordingly, it is possible to prevent the value from largely changing in the measurement sessions. Hence, the area can be obtained with high reproducibility.

In contrast, in the conventional method, the area is calculated on the pixel basis. Since there are pixels each having parts inside and outside an area measurement target range, a judgment is made whether or not to include each of such pixels, as a whole, in the calculation of the area. Thereby, this method does not allow the area to be measured accurately.

This embodiment is configured to obtain the edge position and to calculate the area of a fan shape having the obtained edge position as the intersection of radius and arc. Accordingly, it is possible to avoid calculation on the pixel basis and thereby to reduce an error.

(Pattern Dimension Measuring Method)

Next, a pattern area measuring method will be described with reference to FIG. 8.

Figure 8:
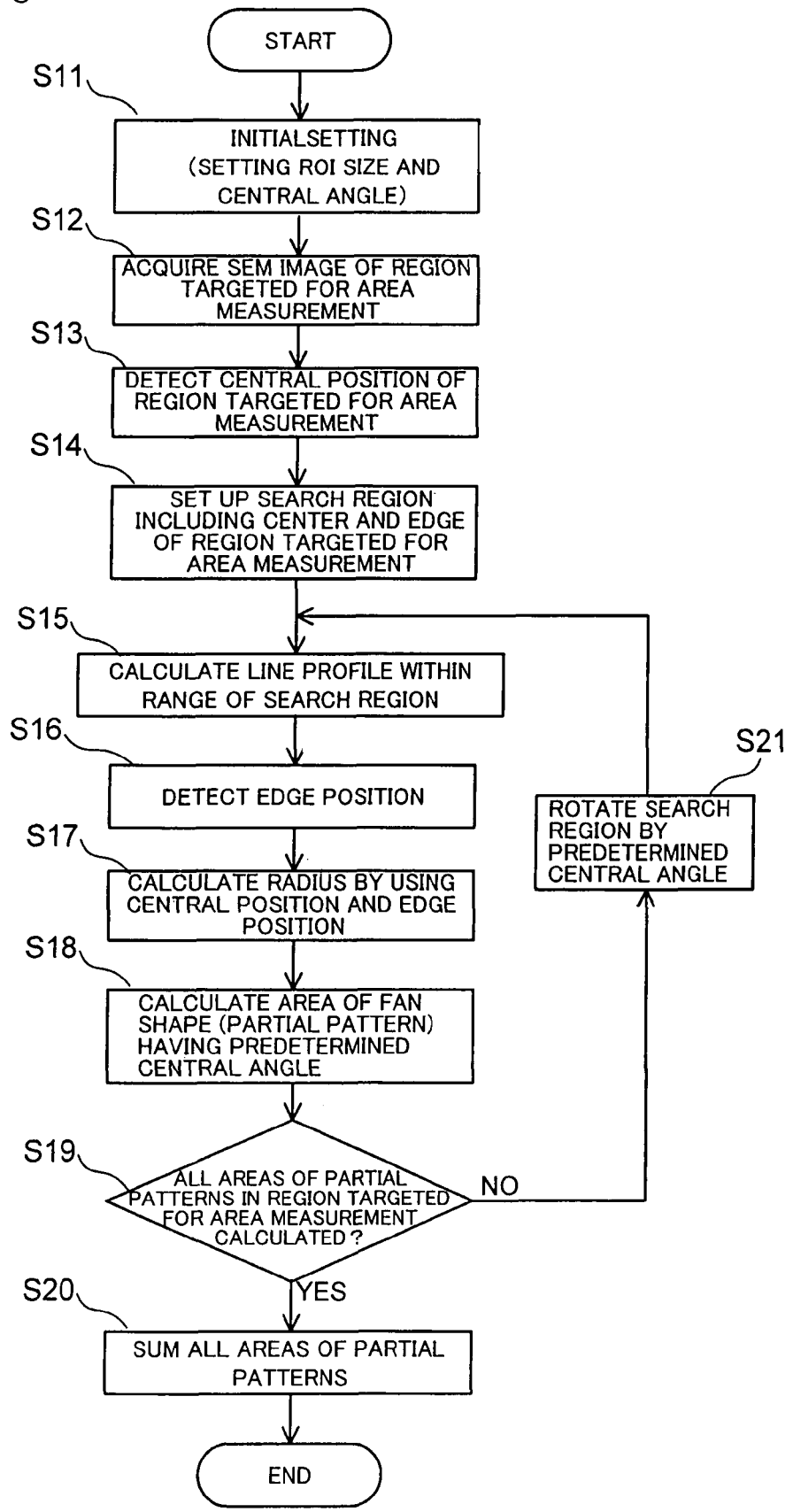
FIG. 8 is a flowchart showing an example of a process for calculating the area of the contact hole.

FIG. 8 is a flowchart showing an example of a process for calculating the area of the pattern such as the contact hole.

In the pattern area measurement process shown in FIG. 8, it is assumed that SEM images of the contact hole and a surrounding area thereof are acquired in advance, and that SEM image data are stored in the storage unit 55 as pixel data. Moreover, the relation between the pixel values and the actual lengths are assumed to be obtained by use of correction samples.

First, initial setting is performed in step S11. In this initial setting, the central angle corresponding to the number of partial patterns and the size of the ROI for specifying the region for calculating the line profile are determined.

Next, in step S12, a desired measurement area including the contact hole and the surrounding area thereof are specified to acquire the SEM images. The SEM image data are extracted from the pixel data stored in the storage unit 55.

Next, the central position of the contact hole, which is an area measurement target, is detected in step S13. The central position is detected as follows. First, the line profile in the X direction is obtained, and the edges on both ends in the X direction are detected. The intermediate point of these edge positions is defined as the center in the X direction. After obtaining the center in the X direction, the line profile in the Y direction of the line including the central position is obtained, and the edges on both ends in the Y direction are detected. The intermediate point of these edge positions is defined as the center of the contact hole. Here, after obtaining the center in the Y direction, it is also possible to obtain the center in the X direction and the center in the Y direction again in order to obtain the central position more accurately.

Next, in step S14, a search region at a predetermined height including the central position of the contact hole and the edge of the contact hole is specified. Alternatively, it is also possible to set the size of the search region based on the data of the contact hole extracted from design data in advance, and to set up the search region automatically so as to include the central position of the contact hole.

Next, in step S15, the line profile in the specified search region is obtained. For example, the luminance data are calculated based on the pixel data for each pixel unit in the direction from the center of the contact hole to the edge. At this time, the height of the search region is set equal to 5 pixels, and the luminance data are obtained by averaging the luminance data corresponding to 5 pixels. In this way, the noises in the luminance data are reduced.

Next, in step S16, the line profile calculated in step S15 is subjected to primary differentiation. The differential profile creating unit performs the primary differentiation process by using a differential filter such as a Sobel filter which is used in general image processing, for example. As a result of the primary differentiation, positions having the maximum value or the minimum value are recorded as the edge position.

Next, in step S17, the radius is derived from the central position of the contact hole and the edge position.

Next, in step S18, the area of the fan shape (the partial pattern) having the obtained edge position as the intersection of radius and an arc is calculated.

Next, in step S19, a judgment is made as to whether or not the areas of the partial patterns are calculated for the entire range of the contact hole. The process goes to step S20 when it is judged that the areas are calculated for the entire range of the contact hole. Meanwhile, the process goes to step S21 when it is judged that the areas have not been calculated for the entire range of the contact hole yet.

Next, in step S20, the area of the contact hole is calculated by summing up all the calculated areas of the partial patterns, and then the process is terminated.

On the other hand, in step S21, the search region is rotated in the amount equivalent to the central angle, thereby rotating the line profile reference line. Thereafter, the process returns to step S15 for acquiring the line profile along the new line profile reference line to detect the edge. Then, the area of the partial pattern in which the edge position is the intersection of the arc and the radius is calculated.

As described above, according to the pattern area measuring method of this embodiment, the pattern is divided into a predetermined number of partial patterns and the area is measured for each of the partial patterns. Then, the area of the pattern is calculated by summing up the areas of the partial patterns. When measuring the area of the partial pattern, the line profile on the line connecting the central position and the edge is obtained, then the edge position is calculated by use of the obtained line profile, and then the radius is obtained by use of the central position and the edge position. When obtaining the line profile, the line profile is calculated by averaging the luminance data for multiple pixels. Then, the area of the fan shape having the obtained edge positions as the intersection of radius and arc is calculated. In this way, even when the luminance signals for the pixels contain noises, the edge position is detected, and the area is calculated by use of the noise-reduced values. Accordingly, it is possible to calculate the area with high reproducibility.

Next, a method of measuring corner rounding of the pattern by employing the area measurement of this embodiment will be described.

Figure 9:
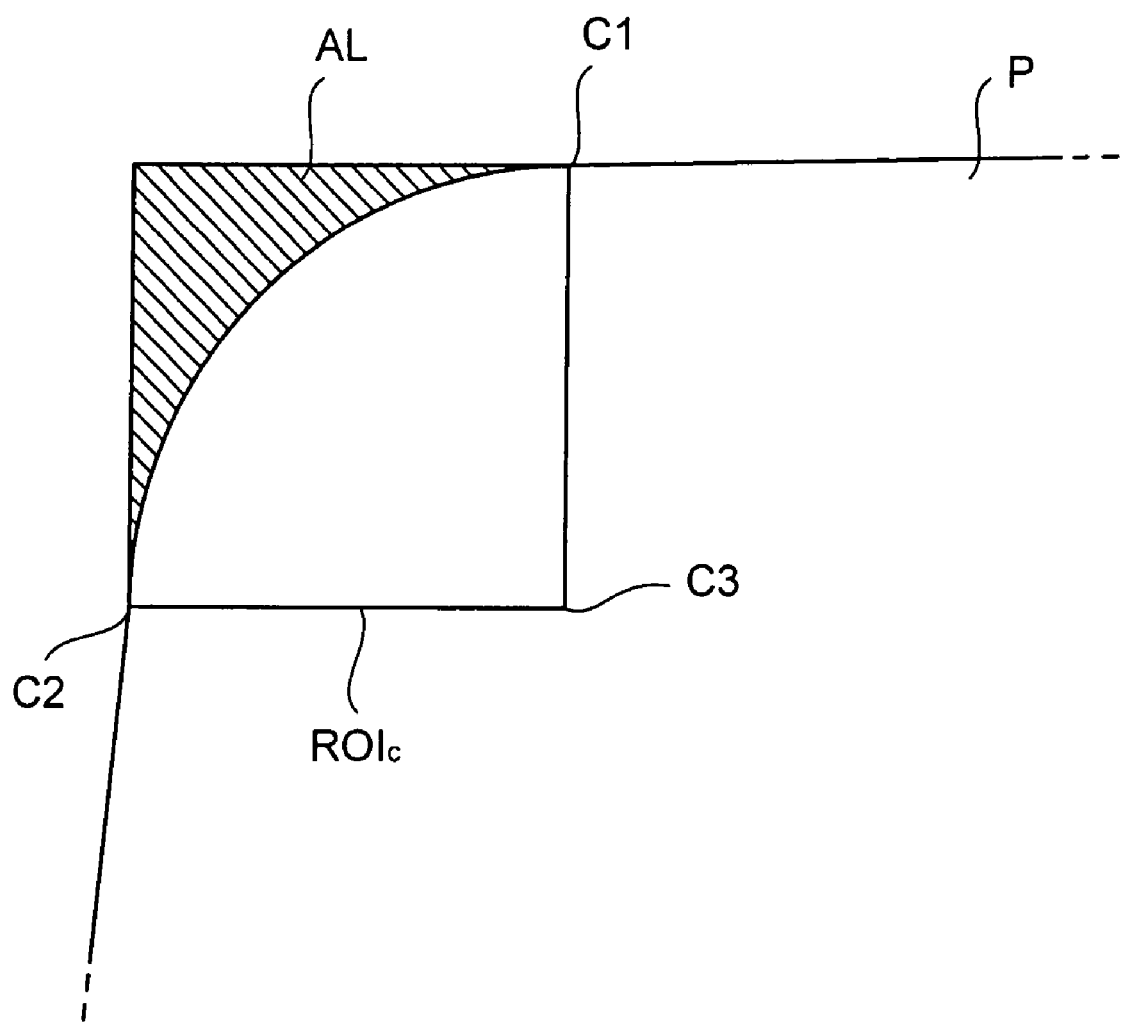
FIG. 9 is a view for explaining measurement of corner rounding.

As shown in FIG. 9, the corner rounding of the pattern is a phenomenon that a corner of a formed pattern P is not formed into a right angle but is slightly rounded instead. When such a pattern P is formed as an electrode of a capacitor, for example, a desired capacitance value may not be obtained if a portion without the pattern is caused by the corner rounding. It is necessary to obtain an accurate value of such a portion without the pattern (an area loss) AL.

Figure 10:
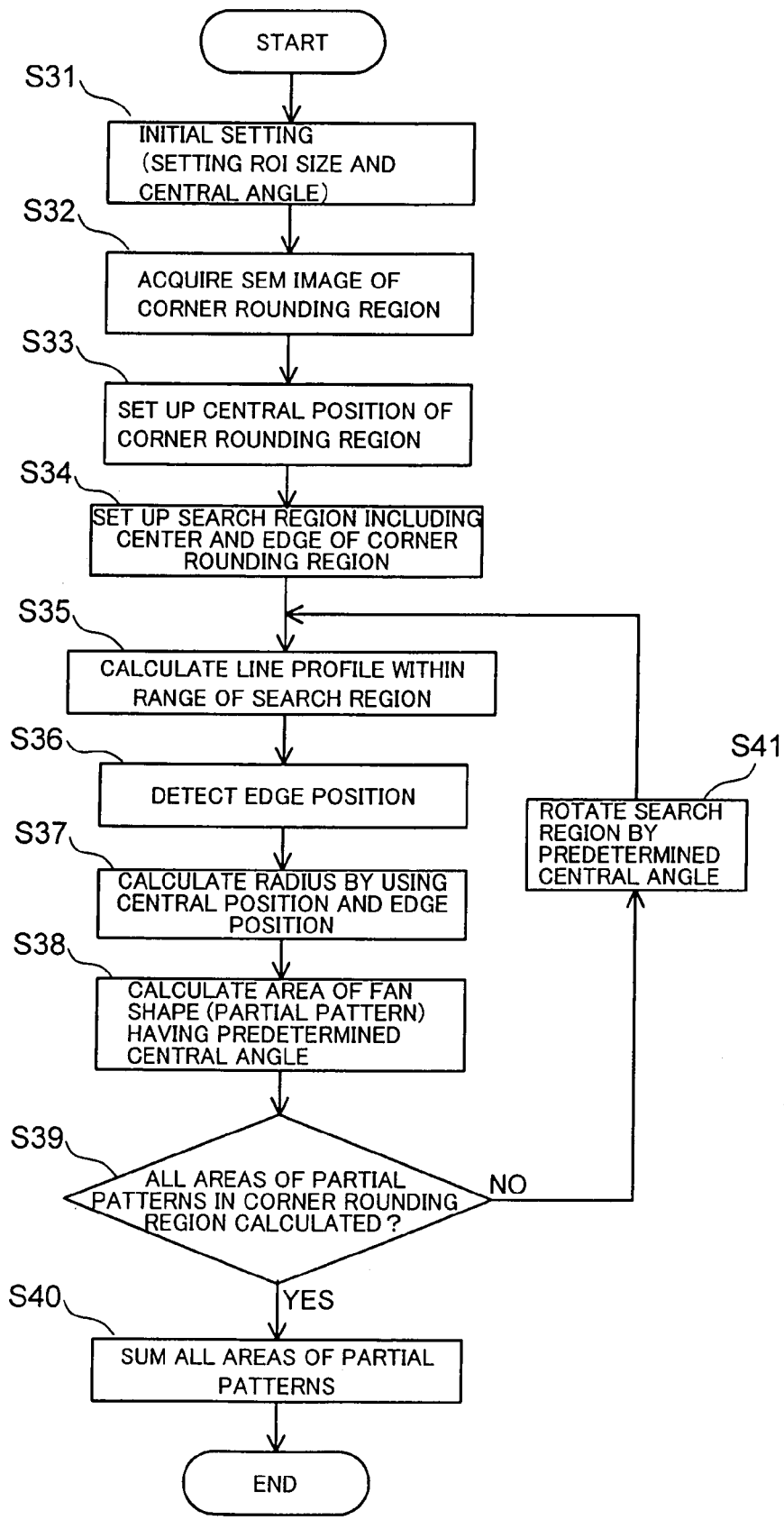
FIG. 10 is a flowchart showing an example of a process for measuring corner rounding.

Now, an area measuring method for the area loss AL will be described below with reference to FIG. 9 and FIG. 10.

First, initial setting is performed in step S31. In this initial setting, a central angle corresponding to the number of partial patterns used for calculating the area of a corner rounding region is determined. Moreover, the size of the ROI for specifying the region for calculating the line profile is determined.

Next, in step S32, the SEM image data of the corner rounding region are acquired. The SEM image data are extracted from the pixel data stored in the storage unit 55.

Next, the central position of the corner rounding region is set up in step S33. The central position is determined by use of an ROIc shown in FIG. 9. More precisely, diagonal corners (C1 and C2) of the ROIc are firstly positioned to be in contact with the edges of the pattern, and then the corner C3 corresponding to the diagonal corners (C1 and C2) in the ROI is determined as the center of a fan shape constituting the corner portion C1C2C3.

Next, a search region including the center C3 and the edge of the rounding portion is set up in step S34.

Next, the line profile in the specified search region is calculated in step S35.

Next, the edge position is detected in step S36. Edge position is detected by performing the primary differentiation on the line profile calculated in step S35 and then finding the position where the signal amount becomes the maximum value or the minimum value.

Next, the radius is derived from the central position C3 and the edge position in step S37.

Next, the area of the fan shape (the partial pattern) having a predetermined central angle is calculated in step S38.

Next, in step S39, a judgment is made as to whether or not all the areas of the partial patterns in the corner rounding region are calculated. The process goes to step S40 when it is judged that all the areas of the partial patterns are calculated. Meanwhile, the process goes to step S41 when it is judged that all the areas have not been calculated yet.

Next, in step S40, the area of the corner rounding portion (C1C2C3) is calculated by summing up all the calculated areas of the partial patterns, and then the process is terminated.

On the other hand, in step S41, the search region is rotated in the amount equivalent to the predetermined central angle, and the process returns to step S35.

After calculating the area of the corner rounding portion in accordance with the above-described processes, the area of the area loss portion AL is calculated by subtracting the area of the corner rounding portion C1C2C3 from the area of the ROI obtained by multiplying a distance between C1 and C3 and a distance between C2 and C3.

According to the above-described method, the area of the corner rounding portion can be calculated reproducibly and accurately, and thus enabling the area of the area loss portion AL to be calculated reproducibly and accurately.

(2) Second Embodiment

The calculation of the area inside a closed curve such as a contact hole has been described in the first embodiment.

The second embodiment is directed to area measurement targeted for a rectangular pattern region. Note that the configuration of the pattern dimension measuring apparatus for measuring the area is similar to the one described in the first embodiment. However, the area measuring unit executes a different process for calculating the area.

Now, a method of calculating the area of a rectangular pattern region will be described below.

Figure 11A:
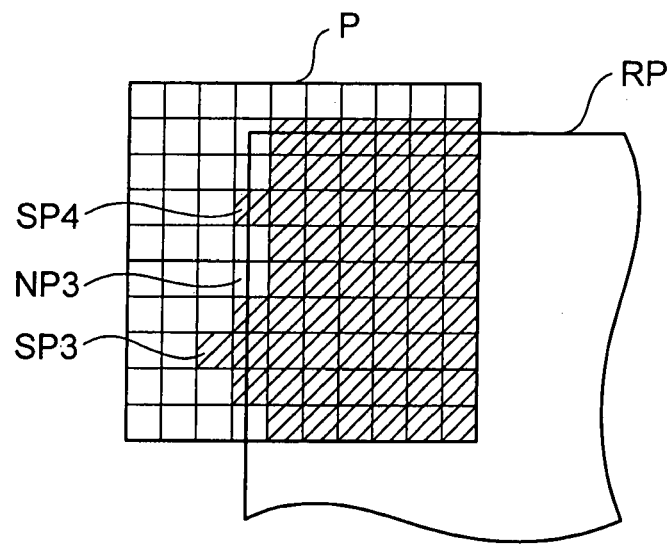
FIG. 11A is a view for explaining a conventional method of calculating the area of a rectangular pattern.

FIG. 11A is a view for explaining a conventional method of calculating the area of a rectangular pattern. Part of a rectangular pattern RP is shown on pixel-based coordinates P. As similar to the case of calculating the area of the pattern of the contact hole described in the first embodiment, at an edge portion of the rectangular pattern RP, a pixel SP4, for instance, is included both in an inside and an outside of the rectangular pattern. Accordingly, it is not clear whether the pixel SP4 is supposed to be included in or excluded from the area of the rectangular pattern. In this way, it is not possible to obtain the area accurately.

Moreover, the pixels may include noises herein. For example, a pixel SP3 may be included or not included in the area depending on the time of measurement. For this reason, this area measurement has poor reproducibility.

Figure 11B:
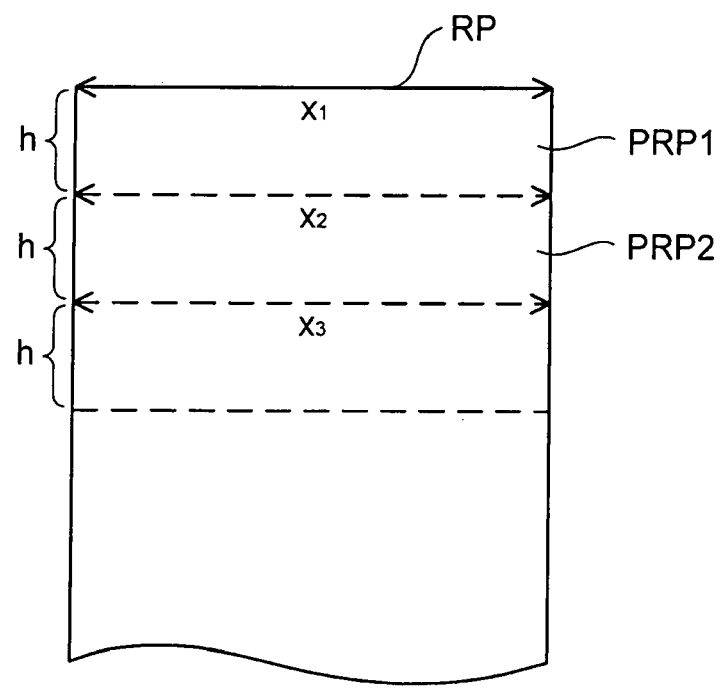
FIG. 11B is a view for explaining a method of calculating the area of a rectangular pattern according to the present embodiment.

FIG. 11B is a view for explaining an outline of a method of calculating the area of a rectangular pattern (a pattern surrounded by first and second edges) of this embodiment. In this embodiment, the area of the rectangular pattern is calculated by dividing the rectangular pattern RP into rectangular partial patterns having predetermined sizes, then by calculating the areas of the respective rectangular partial patterns, and then by summing up the areas of the rectangular partial patterns. Here, the unit of division is defined as h pixels of a height in the Y direction (a predetermined length obtained by sectioning opposed first edges), for example. A distance x1 in the X direction is obtained by calculating edge positions on both sides by unit of calculating the line profile in the X direction of a rectangular partial pattern PRP1 (the line profile on a line which is parallel to opposed second edges, and which intersects the opposed first edges). The area of the rectangular partial pattern PRP1 is calculated by multiplication of this distance x1 and the height h. The areas of other rectangular partial patterns are calculated similarly.

Next, a method of measuring the rectangular pattern will be described with reference to a flowchart in FIG. 12.

Figure 12:
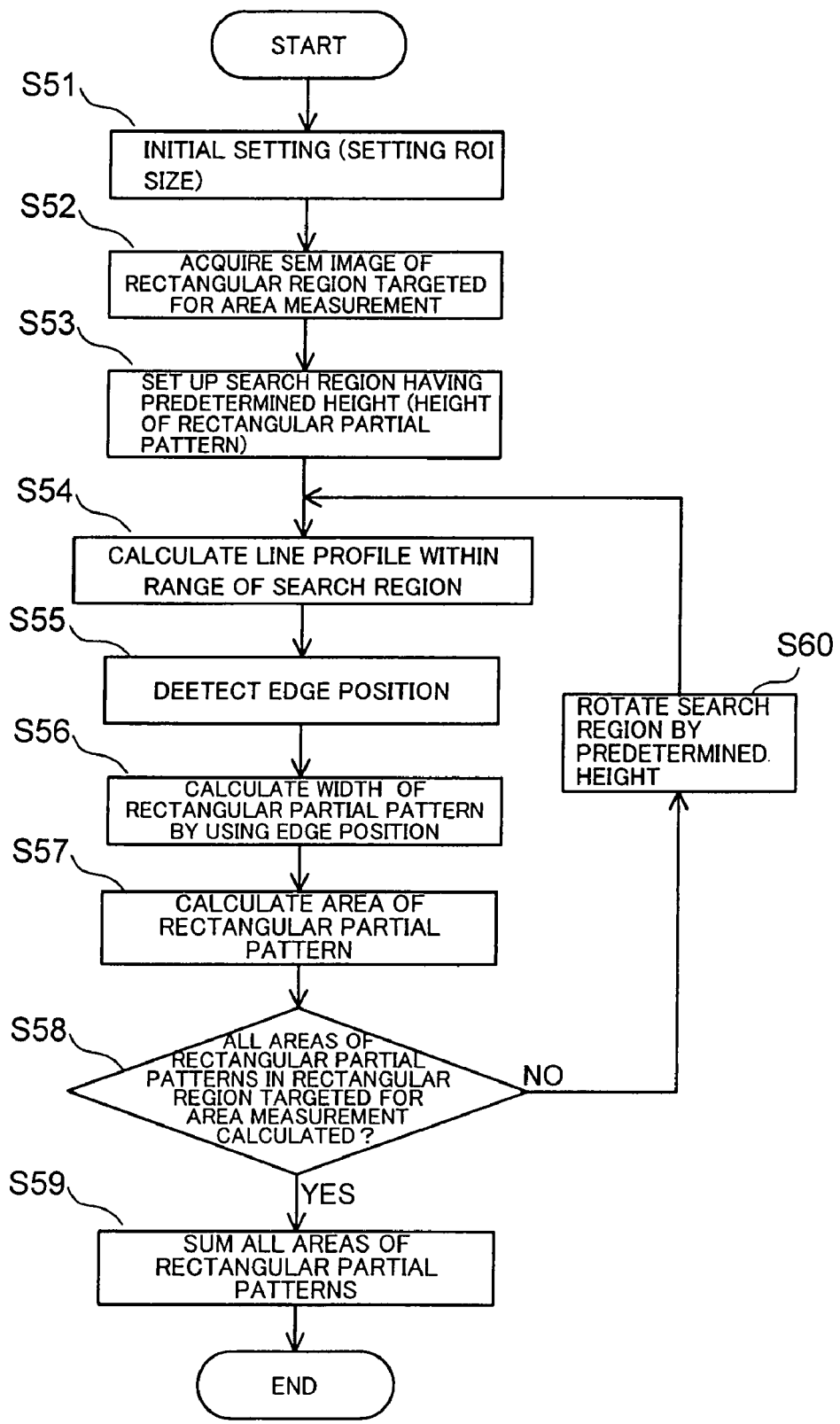
FIG. 12 is a flowchart showing an example of a process for calculating the area of the rectangular pattern.

In the pattern area measurement process shown in FIG. 12, it is assumed that SEM images of the rectangular pattern and a surrounding area thereof are acquired in advance, and that SEM image data are stored in the storage unit 55 as pixel data. Moreover, the relation between the pixel values and the actual lengths are assumed to be obtained by use of correction samples.

First, initial setting is performed in step S51. In this initial setting, the size of the ROI corresponding to the size of the rectangular partial pattern is determined.

Next, in step S52, a desired measurement area including the rectangular pattern and the surrounding area thereof are specified, and the SEM images are acquired. The SEM image data are extracted from the pixel data stored in the storage unit 55.

Next, in step S53, the SEM image data acquired in step S52 are divided into a predetermined number of regions. This process is executed by setting up a search region having a predetermined height of a rectangular partial pattern.

Next, in step S54, the line profile is obtained within a range of the specified search region set up in step S53. Calculation of the line profile is executed by causing the profile creating unit 21 of the control unit 20 to extract the luminance information from the SEM image data.

Next, in step S55, the line profile calculated in step S54 is subjected to primary differentiation. The differential profile creating unit 22 performs the primary differentiation process.

As a result of the primary differentiation, positions having the maximum value and the minimum value are recorded as the edge positions.

Next, in step S56, the width of the rectangular partial pattern is derived from the edge positions.

Next, in step S57, the area of the rectangular partial pattern is calculated by multiplying the calculated width of the rectangular partial region by the height of the search region.

Next, in step S58, a judgment is made as to whether or not all the areas of the rectangular partial regions are calculated. The process goes to step S59 when it is judged that all the areas of the rectangular partial patterns are calculated. Meanwhile, the process goes to step S60 when it is judged that all the areas have not been calculated yet.

Next, in step S59, the area of the specified rectangular region is calculated by summing up all the calculated areas of the rectangular partial patterns, and then the process is terminated.

On the other hand, in step S60, the search region is shifted in the amount equivalent to the predetermined height. Then the process returns to step S54 to calculate the area of another rectangular partial pattern.

Note that, in this process, the area of the specified region is calculated by calculating the area for each of the divided portions and then by summing up the areas thus calculated. Instead, it is possible to obtain the area by calculating an average width of the rectangular patterns based on the divided regions and then by multiplying the width by the height of the entirety of the specified region.

As described above, in this area measurement of the rectangular pattern region, the rectangular pattern is divided into a predetermined number of partial patterns, then the area of each of the partial patterns is obtained, and then the area of the rectangular pattern is calculated by summing up the areas of the partial patterns. When calculating the area of the partial pattern, the edge positions are calculated by use of the line profile while averaging a predetermined number of the pixel data. The area of the partial pattern is calculated by multiplying the distance between the edges by a predetermined number of the pixel size. In this cay, even when the luminance signals for the pixels contain noises, the edge position is detected, and the area is calculated by use of the noise-reduced values. Accordingly, it is possible to calculate the area reproducibly and accurately.

(3) Third Embodiment

In this embodiment, area measurement targeted for a pattern having a complicated shape will be described.

Figure 13A:
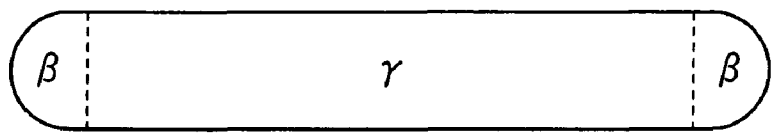
FIGS. 13A to 13C are views showing examples of arbitrarily-shaped patterns.
Figure 13B:
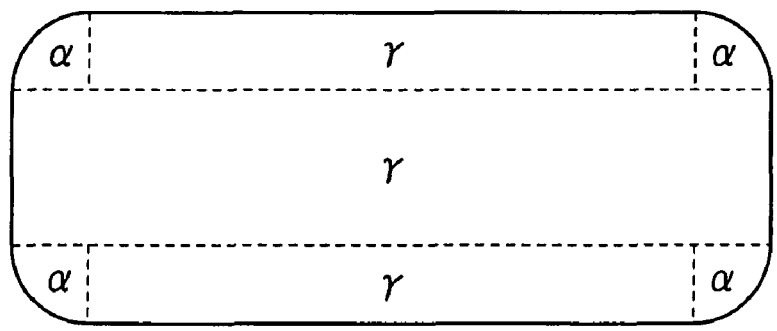
Figure 13C:
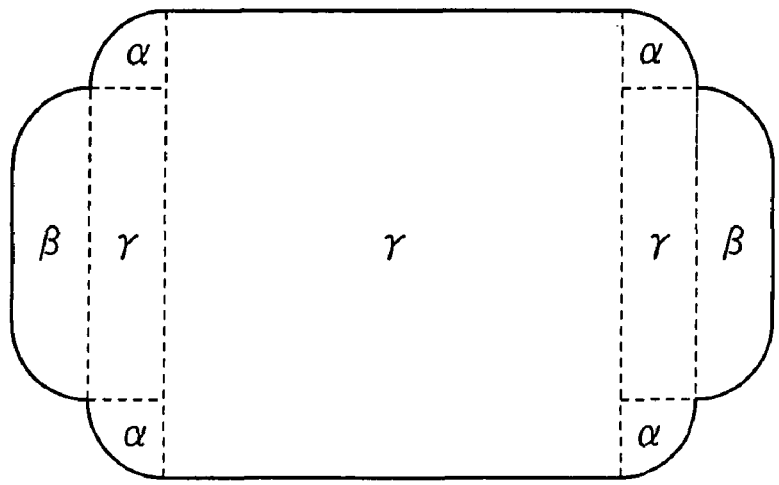

FIGS. 13A to 13C are views showing patterns having complicated shapes.

When the pattern has a shape as shown in any of FIGS. 13A to 13C, the pattern is divided into the shapes of the patterns targeted in the first and second embodiments (such patterns will be hereinafter referred to as standard figure patterns), and a total area is calculated after obtaining respective areas of the divided patterns.

The standard figure patterns include a fan-shape pattern ($\alpha$ in FIG. 13B), a domical pattern ($\beta$ in FIG. 13A), and a rectangular pattern ($\gamma$ in FIG. 13A).

Hereinbelow, description will be given of a case of obtaining an area of a pattern shown in FIG. 14.

Figure 14:
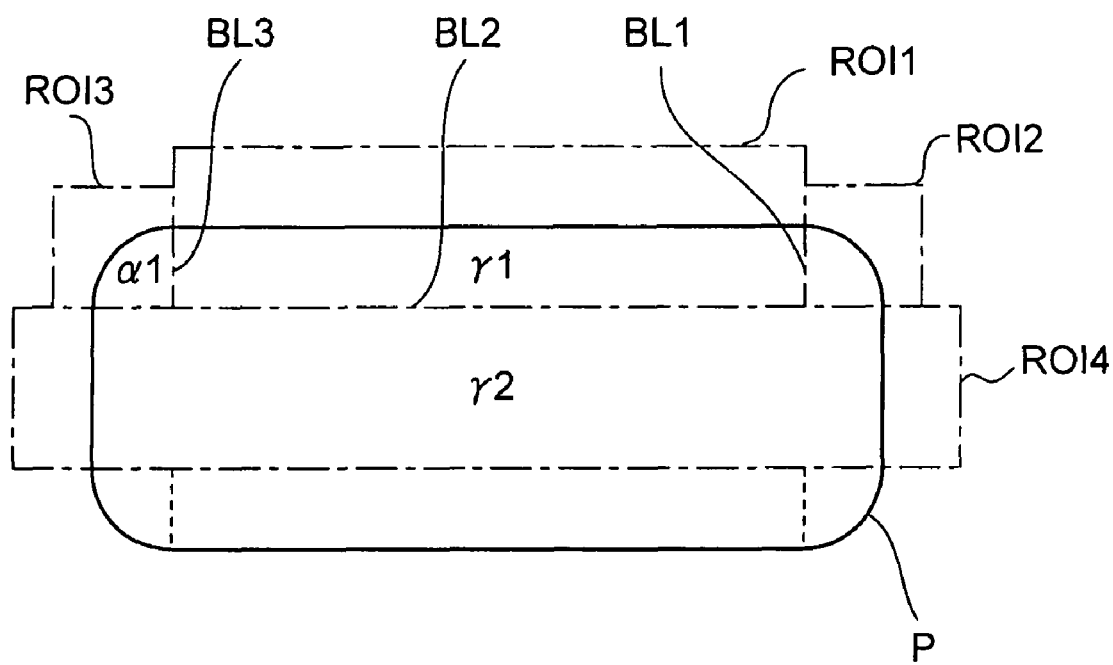
FIG. 14 is a first view for explaining a method of measuring an area of an arbitrarily-shaped pattern.

When the pattern has a shape as shown in FIG. 14, the pattern is divided into the standard figure patterns to begin with. The division is performed in such a way that the divided patterns include the standard figure patterns. For example, a specified region at a portion $\alpha 1$ in FIG. 14 is defined as shown in a ROI3. Meanwhile, in FIG. 14, a specified region at a portion γ1 is defined as shown in a ROI1. Moreover, in FIG. 14, a specified region at a portion γ2 is defined as shown in a ROI4.

In this specification process, the divided regions are specified so as not to overlap each other inside the divided patterns. Specifically, the regions ROI1 and ROI3 are specified so as to share an aligned boundary BL3. Moreover, a boundary BL2 between the region ROI4 and the regions ROI3, ROI1 and ROI2 is specified so as not to overlap the regions ROI4 with the regions ROI3, ROI1, and ROI2.

After the division is performed so as to cover the entire pattern P, the areas of the divided patterns are calculated for the respective specified regions, and then the area of the entire pattern is calculated by summing up all the areas in the specified regions.

Now, the area calculation in the specified region for the pattern α1 will be described.

The area of the pattern α1 is calculated by use of the area measuring method for a cornered portion as described in conjunction with the corner rounding measurement in the first embodiment.

The areas of the patterns γ1 and γ2 are calculated by use of the area measuring method for a rectangular pattern as described in the second embodiment.

Meanwhile, the area of the pattern β in FIG. 13A is calculated by modifying the method of calculating the area of the corner rounding as described in the first embodiment. The corner rounding described in the first embodiment is targeted for one corner. However, the pattern β in FIG. 13A is a domical and therefore has two corners. In this case, the middle point of the boundary with an adjacent partial pattern is determined as the center of the pattern β.

As described above, in the area measurement of the complicated pattern, the area of the pattern is calculated by dividing the pattern into the standard figure patterns, then by calculating the areas of the divided patterns, and then by summing up the areas of the respective patterns. When calculating the area of each of the standard figure patterns, the standard figure pattern is divided into partial patterns and the area is calculated for each of the divided patterns. When calculating the area of the partial pattern, the area is obtained by calculating the edge position based on the line profile obtained by averaging a predetermined number of pixel data, and by calculating the length of the rectangle or the radius of the fan shape. In this way, even when the luminance signals for the pixels contain noises, the edge position is detected, and then the area is calculated by use of the noise-reduced values. Accordingly, it is possible to calculate the area with high reproducibility.

(4) Fourth Embodiment

This embodiment is directed to area measurement targeted for a pattern in an arbitrary shape, which is not limited to a combination of the pattern shapes targeted in the first and second embodiments. In this embodiment, edge positions showing a periphery of a closed pattern are detected, and then the area of the pattern is calculated by using those edge positions in accordance with the trapezoidal rule.

Note that the configuration of the pattern dimension measuring apparatus for measuring the area is similar to the apparatus described in the first embodiment. However, the area measuring unit executes a different process for calculating the area.

Now, using a pattern having a shape illustrated in FIG. 15 as an example, the area measuring method will be described below with reference to flowcharts in FIG. 16 to FIG. 18.

Figure 16:
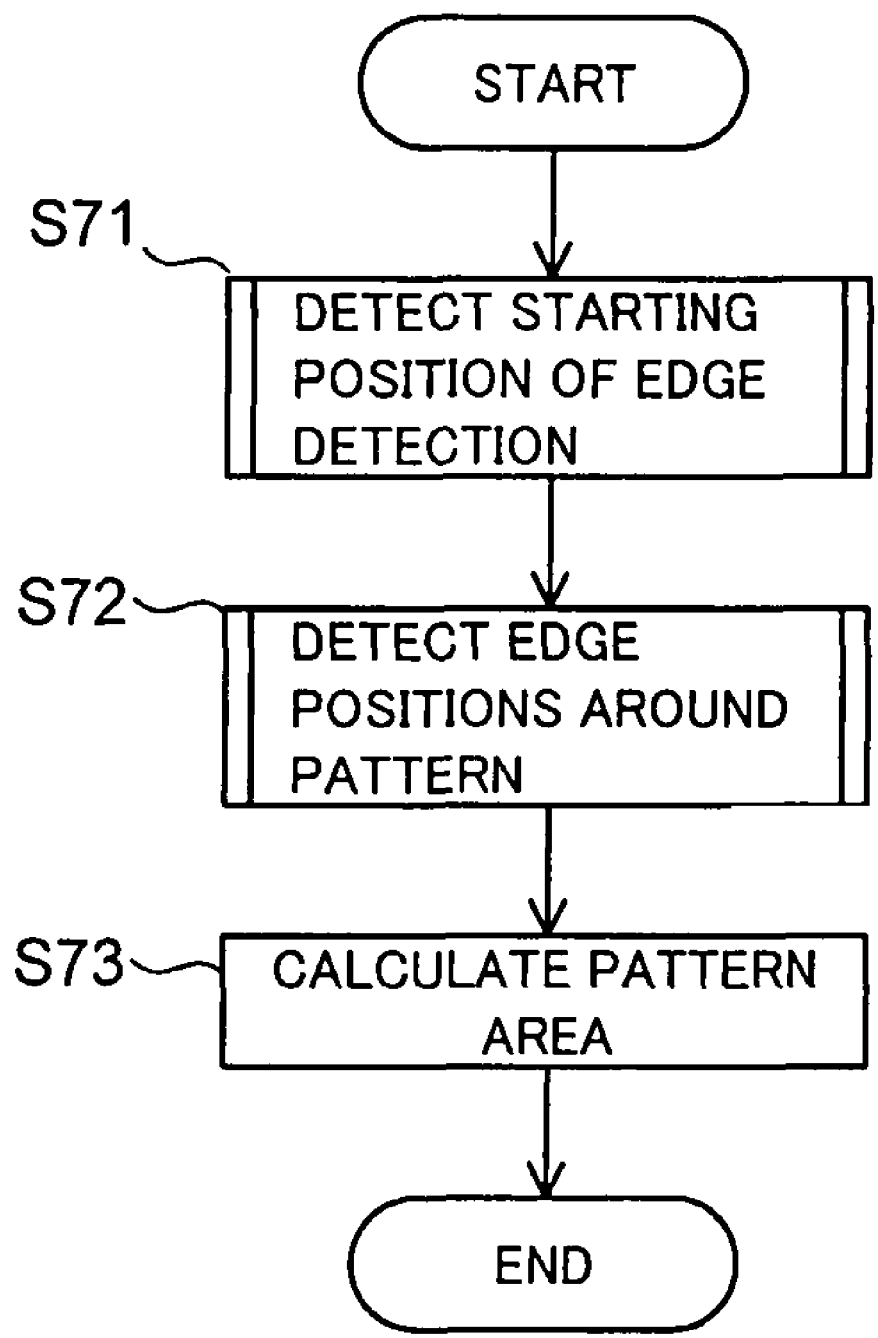
FIG. 16 is a flowchart showing an outline of a process for calculating the area of the arbitrarily-shaped pattern.

FIG. 16 is a flowchart showing an outline of a pattern area measuring process. First, a starting position of edge detection is detected as shown in step S71, and edge positions around the pattern are detected at a predetermined interval in the next step S72. By use of the detected edge positions, the area of the pattern is calculated in step S73.

Figure 17:
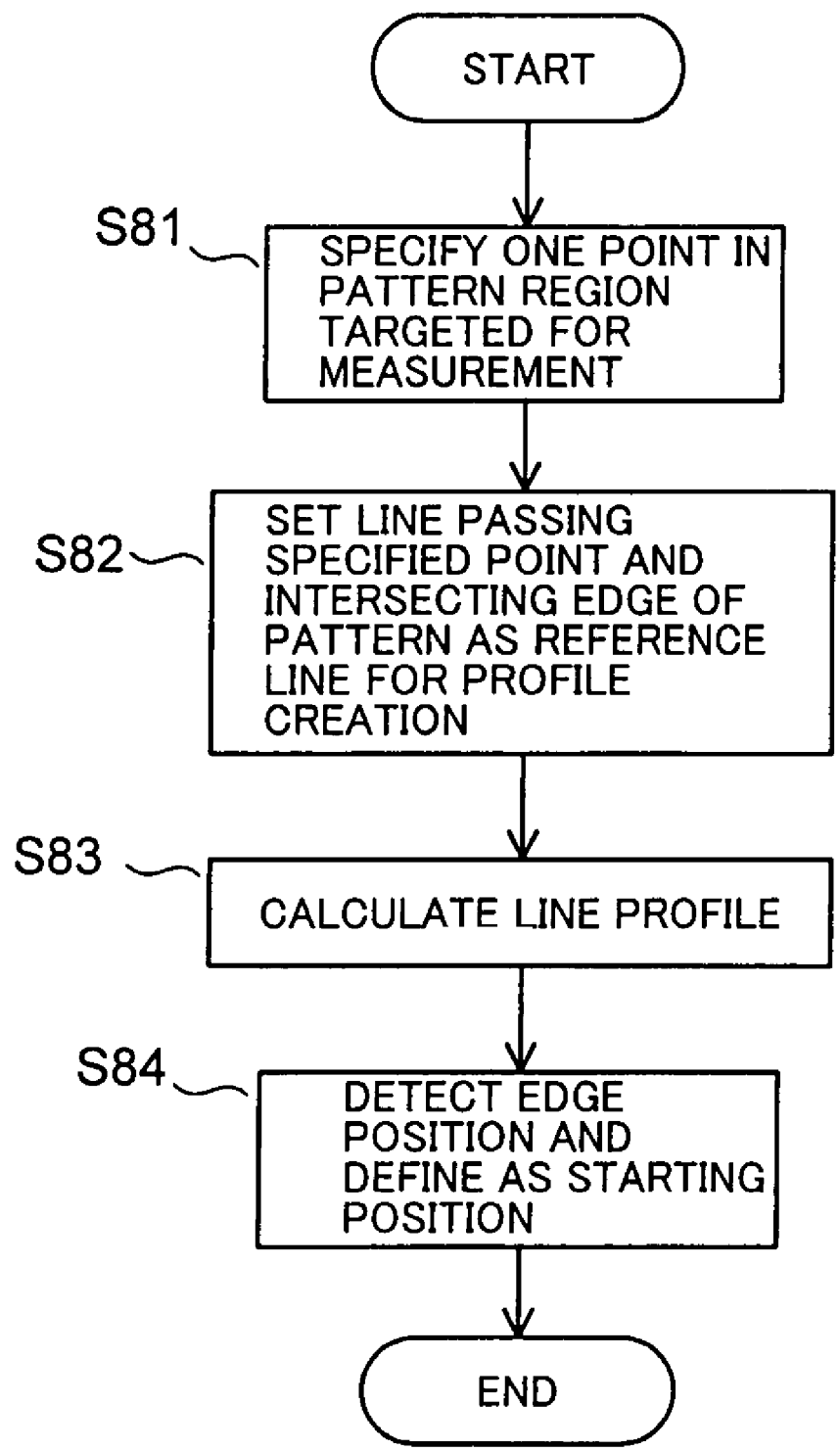
FIG. 17 is a flowchart showing an example of a process for detecting a starting position of edge detection in FIG. 16.

FIG. 17 is a flowchart showing a process for detecting the starting position of the edge.

First, in step S81 in FIG. 17, one point (a point M in FIG. 15) inside a measurement target pattern PA is specified as a specified point. In this specification process, an arbitrary point inside the pattern PA is specified in a SEM image of the pattern PA targeted for area measurement.

In the next step S82, a line extending from the specified point M to an intersection with an edge of the pattern PA is set up as a reference line for profile creation. For example, a line extending from the specified point M to an upper right direction at an angle of 45 degrees is defined as the reference line.

In the next step S83, the line profile is calculated along the reference line. Calculation of the line profile is executed by allowing the profile creating unit 21 of the control unit 20 to extract the luminance information out of the SEM image data. Meanwhile, the line profile is calculated by averaging the luminance data of multiple pixels as described in the first embodiment. The calculated line profile is subjected to primary differentiation by use of the differential profile creating unit 22.

In the next step S84, by using the differential profile obtained by primary differentiation, an edge position is detected by detecting a position closest to the specified point M while having either a positive peak value or a negative peak value of a partial signal amount. This edge position is defined as the starting position for edge detection around the pattern.

Detection of the edge positions around the pattern is started from the starting point ES determined by the above-described process. Now, the edge detection process around the pattern will be described with reference to FIG. 18 to FIG. 19D. FIG. 18 is a flowchart showing an example of the edge detection process around the pattern. Meanwhile, FIGS. 19A to 19D are views for explaining the edge detection around the pattern.

Figure 18:
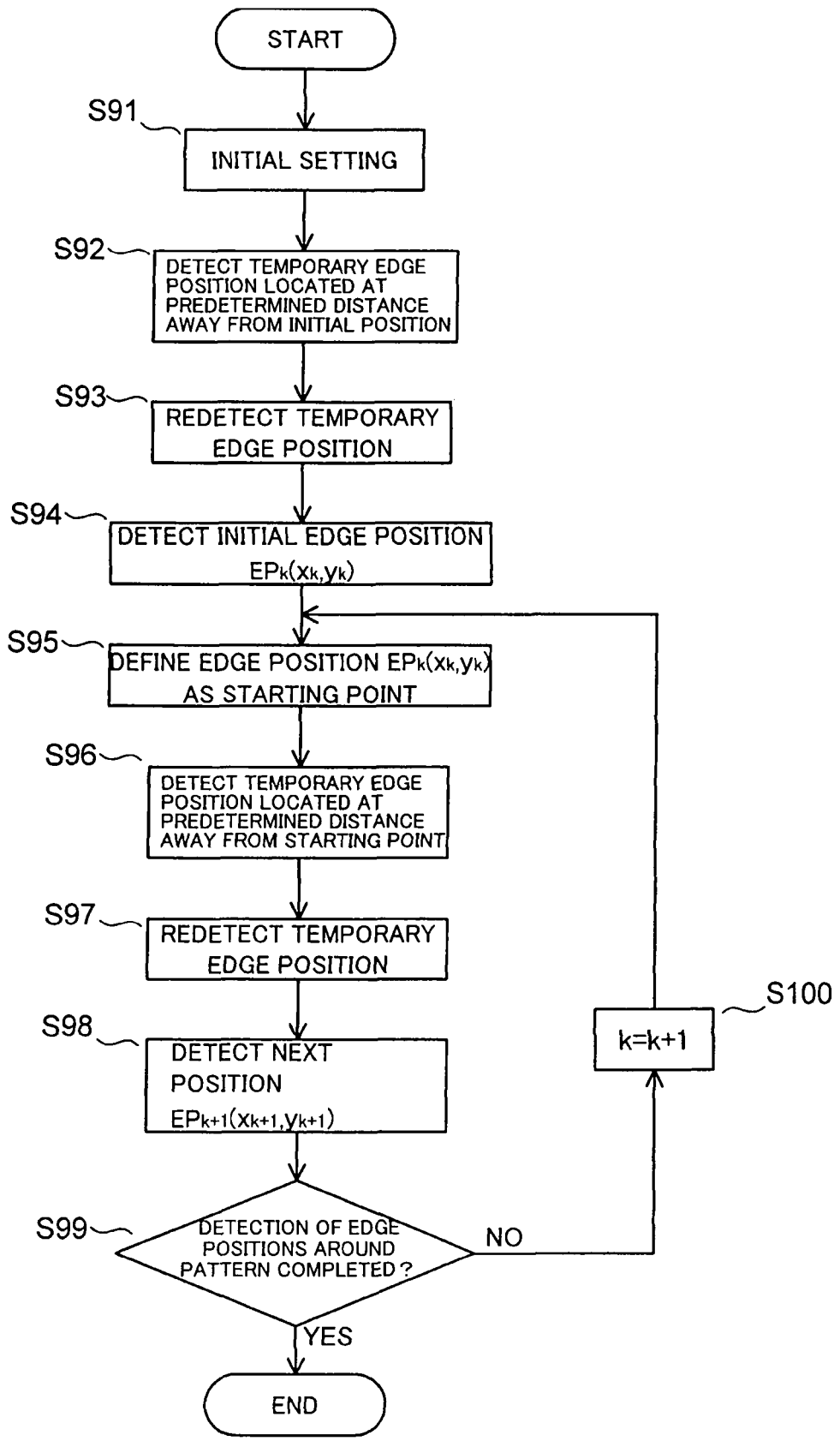
FIG. 18 is a flowchart showing an example of a process for detecting edge positions around a pattern in FIG. 16.

First, initial setting is performed in step S91 in FIG. 18. In this initial setting, a predetermined interval (hereinafter referred to as a specified step) is specified for detecting the edges around the pattern. For example, this specified step is set to a distance corresponding to a predetermined number of pixels. Moreover, a counter k for indicating the position of the detected edge around the pattern is set to 0.

In the subsequent Steps S92 to S94, an edge position located at a distance of a predetermined specified step d away from the starting position ES is detected.

Figures 19A, 19B, 19C, 19D:
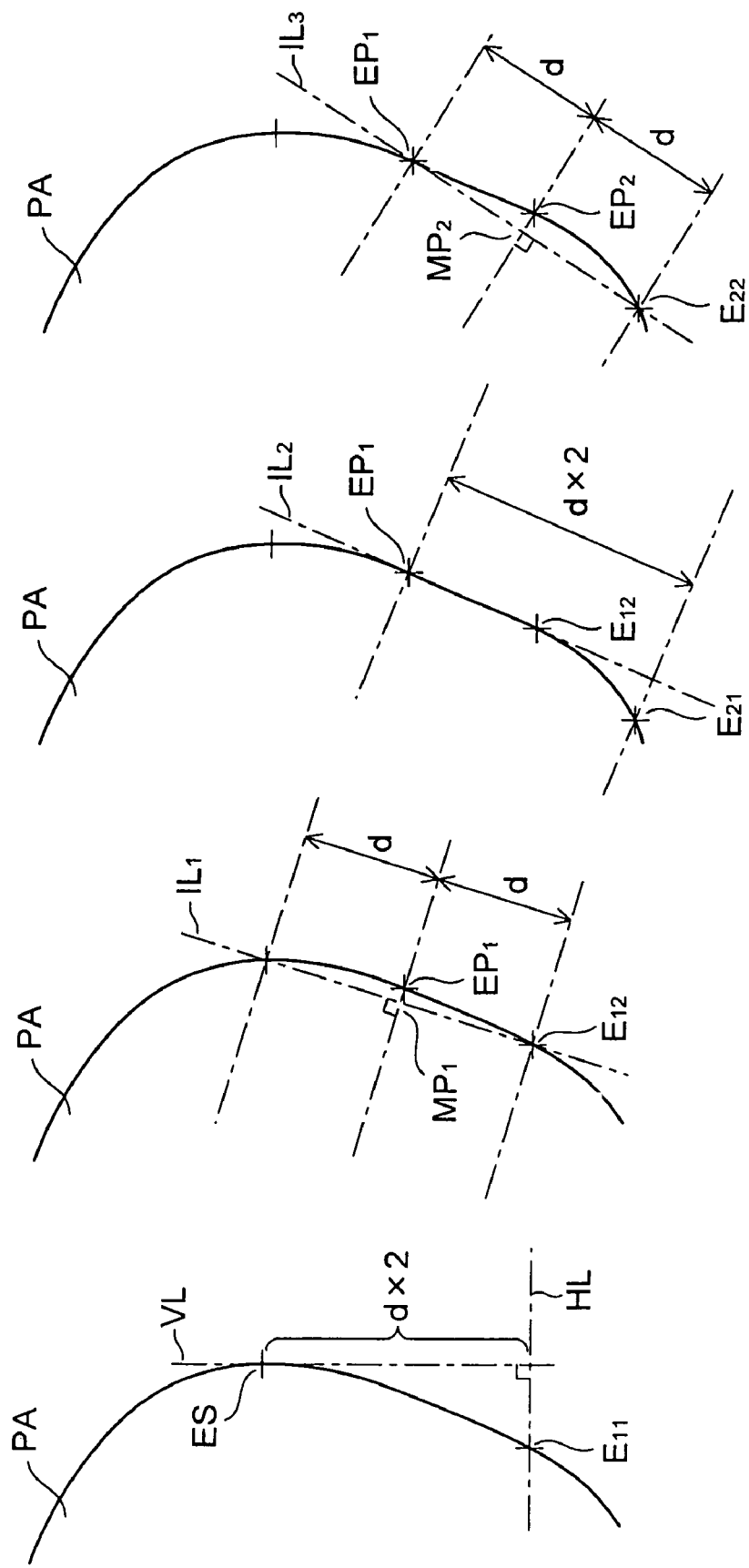
FIGS. 19A to 19D are views for explaining a method of detecting the edge positions around the pattern.

In step S92, a temporary edge is detected in a position at a distance of (specified step d×2) away from the starting position ES that is detected in the process shown in FIG. 17. To be more precise, as shown in FIG. 19A, an edge $E_{11}$ is detected by creating the line profile while defining a line HL, which is orthogonal to a straight line VL extending downward (in a −Y direction) in FIG. 19A from the starting position ES in the position of the (specified step d×2), as the reference line for profile creation. The edge $E_{11}$ thus detected is defined as the temporarily detected edge $E_{11}$. Although the edge is detected in the position in the −Y direction from the starting position ES in FIG. 19A, it is also possible to detect an edge in the X direction from the starting position ES for a certain shape of a pattern.

In the next step S93, the temporarily detected edge $E_{11}$ detected in step S92 is redetected. The temporarily detected edge position is redetected by defining a line orthogonal to a straight line connecting the starting position ES and the temporarily detected position $E_{11}$ at a distance of the (specified step d×2) away from the starting position ES as the reference line for profile creation and by obtaining the line profile on this reference line. Redetection of the temporarily detected edge position is executed in order to approximate the distance from the starting position ES to the (specified step d×2).

An initial edge position is detected in the next step S94. The line profile is obtained on a line which is orthogonal to a straight line $IL_1$ connecting the starting position ES and the redetected temporarily detected edge position $E_{12}$ in the middle position $MP_1$, thereby detecting an edge $EP_k$ ($x_k$, $y_k$) In FIG. 19B, an edge $EP_1$ is detected as a first edge. By detecting the edge $EP_k$ ($x_k$, $y_k$) as described above, it is possible to detect the edge on the line which is almost perpendicular to the periphery of the pattern. Accordingly, the edge position can be detected accurately.

In the next step S95, the edge $EP_k$ ($x_k$, $y_k$) is defined as the starting point for detecting the next edge. In FIG. 19C, the edge $EP_1$ is defined as the starting point.

In the subsequent Steps S96 to S98, an edge position $EP_{k+1}$ ($x_{k+1}$, $y_{k+1}$) located at a distance of the predetermined specified step d away from the starting edge position $EP_k$ ($x_k$, $y_k$) is detected.

In step S96, an edge is detected by creating the line profile while defining a line, which is orthogonal to a straight line $IL_2$ connecting the starting point $EP_1$ and the redetected temporarily detected edge $E_{12}$ at a distance of the (specified step d×2) away from the starting point $EP_1$, as the reference line for profile creation. The edge thus detected is defined as a temporarily detected edge $E_{21}$.

In the next step S97, as similar to step S93, the temporarily detected edge position is redetected by defining a line orthogonal to a straight line connecting the starting position $EP_1$ and the temporarily detected position $E_{21}$ at a distance of the (specified step d×2) away from the starting position $EP_1$ as the reference line for profile creation and by obtaining the line profile on this reference line.

In the next step S98, the line profile is obtained on a line which is orthogonal to a straight line $IL_3$ connecting the starting position $EP_1$ and the redetected temporarily detected edge position $E_{22}$ in the middle position $MP_2$, thereby detecting an edge $EP_{k+1}$. In FIG. 19D, an edge $EP_2$ is detected as a second edge.

In the next step S99, a judgment is made as to whether or not all the edges around the pattern are detected. The process is terminated when it is judged that all the edges are detected. On the other hand, the process goes to step S100 when it is judged that all the edges have not been detected yet.

In the next step S100, k=k+1 is calculated, and then the process goes to step S95 to detect the next edge position.

Figure 15:
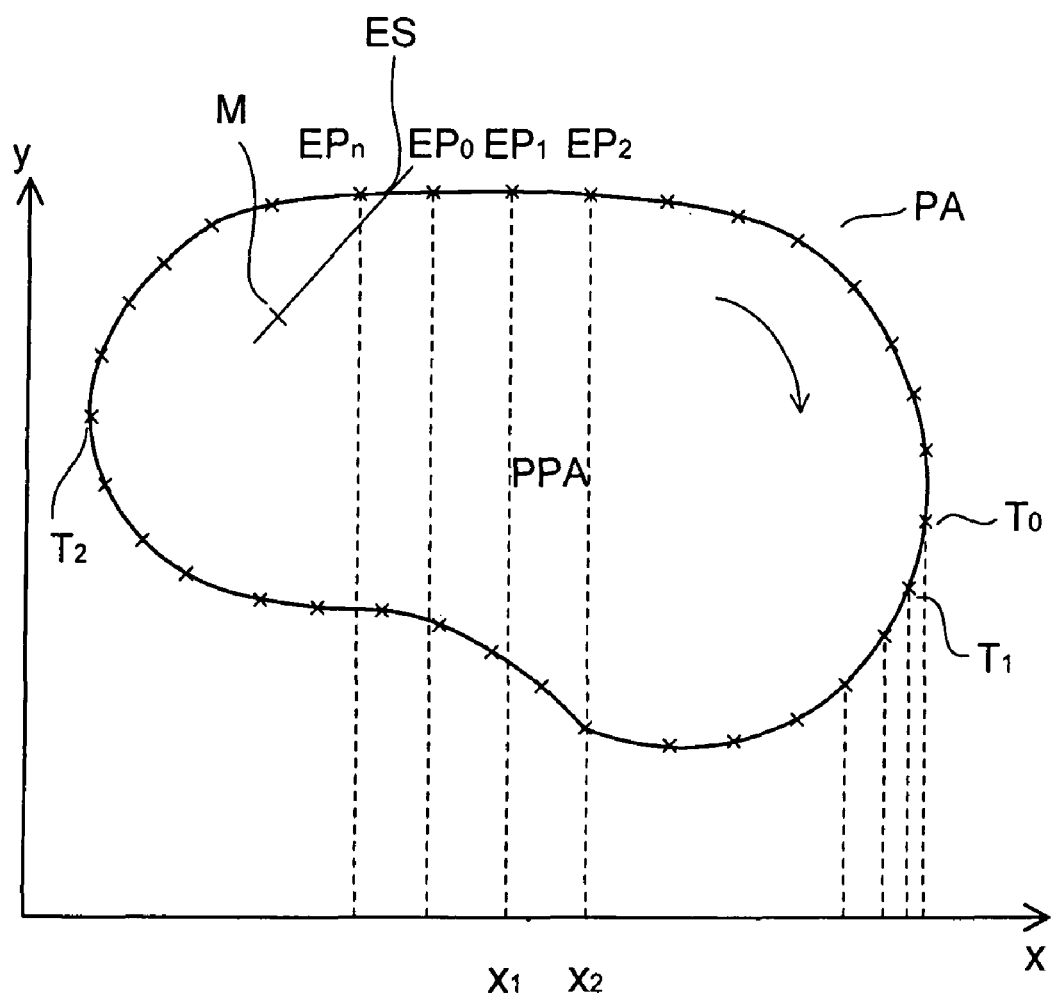
FIG. 15 is a second view for explaining a method of measuring an area of another arbitrarily-shaped pattern.

By executing the above-described process, the edge positions $EP_0$, $EP_1$, and so on are detected around the pattern as shown in FIG. 15.

Next, description will be given of an area calculation of the pattern based on the edge positions around the pattern detected in the above-mentioned process.

In this embodiment, the area of the pattern is calculated by applying the edge positions to the trapezoidal rule.

It is assumed that n pieces of the edges EP indicating the periphery of the pattern are detected, and that the position of the k-th edge is defined as $EP_k$ ($x_k$, $y_k$).

By using all the detected edge positions, the area S of the pattern is calculated in accordance with the following formula (1):

$$S = \sum_{k=1}^{n} \left( (X_k - X_{k-1}) \times \frac{(Y_k + Y_{k-1})}{2} \right) + (X_0 - X_n) \times \frac{(Y_0 + Y_n)}{2} \quad (1)$$

For example, in FIG. 15, a trapezoidal region ($x_1 x_2 EP_1 EP_2$) including a partial pattern PPA of the pattern PA is defined by the mutually adjacent edges $EP_1$ and $EP_2$. The area of the pattern is calculated by adding or subtracting the areas of the trapezoidal shapes determined by the adjacent edges.

In the example of FIG. 15, in the trapezoidal regions to be defined by the edge positions from $T_2$ to $T_0$ on an upper side of the pattern PA, the areas combining the region PPA (referred to as the partial pattern) such as the region ($x_1 x_2 EP_1 EP_2$) obtained by dividing the pattern PA and regions not including the pattern PA are calculated. Meanwhile, in the trapezoidal regions to be defined by the edge positions from $T_1$ to $T_2$ on a lower side of the pattern PA, the areas not including the pattern PA are calculated.

Accordingly, the area of the pattern PA is calculated by adding the areas of the trapezoidal regions defined by the edge positions from $T_2$ to $T_0$ on the upper side of the pattern PA and subtracting the trapezoidal regions to be defined by the edge positions from $T_1$ to $T_2$ on the lower side of the pattern PA.

Specifically, the area of the pattern is calculated by adding the areas of the trapezoidal shapes having the X-coordinate values of the edge positions satisfying $X_k - X_{k-1} > 0$, and by subtracting the areas of the trapezoidal shapes having the X-coordinate values of the edge positions satisfying $X_k - X_{k-1} < 0$.

Figure 20:
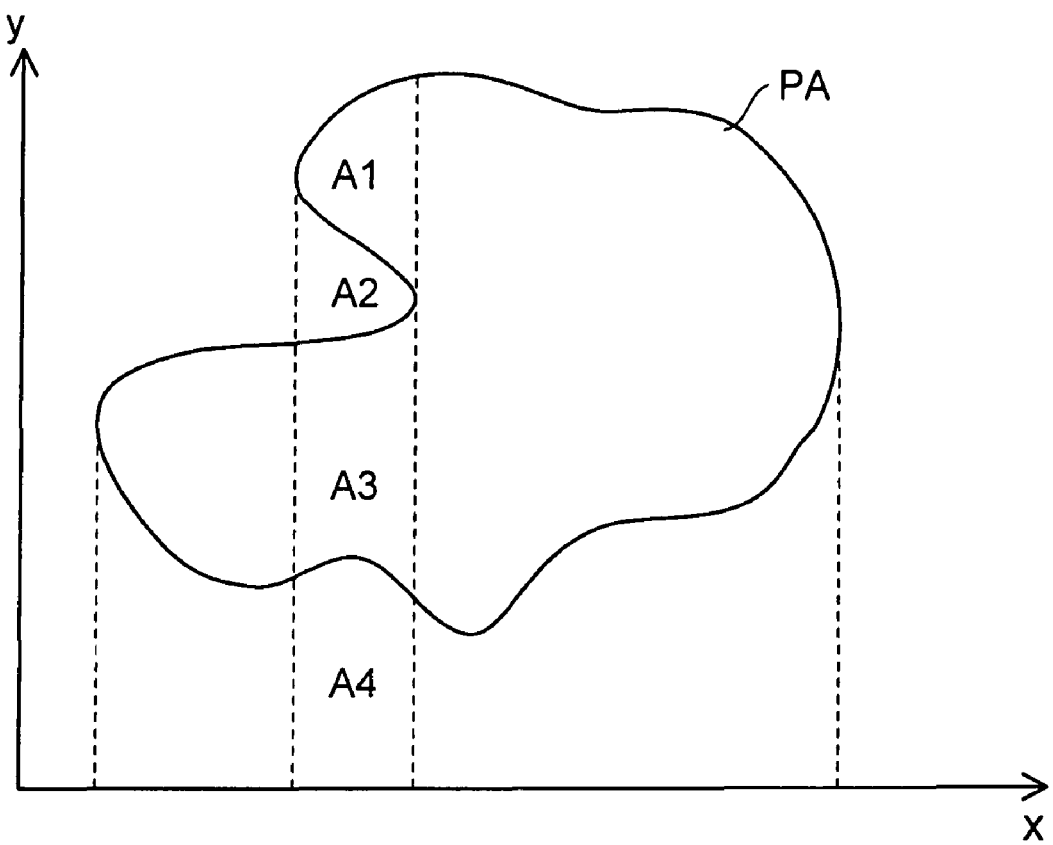
FIG. 20 is a third view for explaining a method of measuring an area of another arbitrarily-shaped pattern.

It is to be noted that the area of the pattern can be calculated in accordance with this method even when the pattern has a more complicated shape (in which part of the pattern forms a concave portion in the Y direction) as shown in FIG. 20. Specifically, concerning regions A1, A2, A3, and A4 in FIG. 20, the regions A3 and A4 are added twice while the region A4 is subtracted twice. Accordingly, among the regions from A1 to A4, the areas of the regions A1 and A3 are calculated in the end, and thus making it possible to calculate the area of the pattern PA properly.

As described above, in the fourth embodiment, the edge positions around the pattern are automatically detected by specifying one point in the SEM image pattern when calculating the area of the pattern, and the area of the pattern is calculated by employing the trapezoidal rule based on the detected edge positions. In this way, it is possible to reduce a burden of user for specifying the target range and to prevent deterioration in measurement accuracy due to erroneous range specification.

Moreover, the edges around the pattern are detected by use of the line profiles while averaging a predetermined number of the pixel data. In this way, even when the luminance signals for the pixels contain noises, the edge position is detected by use of the noise-reduced values.

Furthermore, when detecting the edges around the pattern, the next edge position is detected by use of the line profile on the line which is orthogonal to the straight line connecting the detected edge position and the temporary edge position located at a predetermined distance in the intermediate position. In this way, it is possible to detect each of the edges on the line almost perpendicular to the periphery of the pattern.

Accordingly, the edge positions can be detected accurately, and thereby the pattern area is calculated accurately.

What is claimed is:

1. A pattern dimension measuring apparatus comprising:
   a unit for irradiating an electron beam onto a sample in a scanning manner;
   a unit for acquiring image data of a pattern according to the quantity of electrons emitted, by irradiation of the electron beam, from a surface of the sample where the pattern is formed;
   an area measuring unit for dividing the pattern into a plurality of partial patterns, calculating the areas of the partial patterns, and calculating the area of the pattern by summing up the areas of the partial patterns;
   a line profile creating unit for creating a line profile to represent a luminance signal on a predetermined line out of the image data; and
   a differential profile creating unit for creating a differential profile by differentiating the line profile,
   wherein, when the pattern is a rectangular pattern surrounded by opposed first and second edges, the area measuring unit divides the rectangular pattern into rectangular partial patterns by sectioning the opposed first edges into parts of a predetermined length; calculates the distance between the opposed first edges for each of the rectangular partial patterns, by use of the line profile and the differential profile on a line being parallel to the opposed second edges and intersecting the opposed first edges; calculates the area of each of the rectangular partial patterns by multiplying the predetermined length and the distance; and calculates the area of the rectangular pattern by summing up the areas of the rectangular partial patterns.

2. The pattern dimension measuring apparatus according to claim 1,
   wherein the line profile creating unit creates the line profile on the line by averaging a predetermined number of pixel data corresponding to the predetermined length.

3. A pattern dimension measuring apparatus comprising:
   a unit for irradiating an electron beam onto a sample in a scanning manner;
   a unit for acquiring image data of a pattern according to the quantity of electrons emitted, by irradiation of the electron beam, from a surface of the sample where the pattern is formed;
   an area measuring unit for dividing the pattern into a plurality of partial patterns, calculating the areas of the partial patterns, and calculating the area of the pattern by summing up the areas of the partial patterns,
   a line profile creating unit for creating a line profile to represent a luminance signal on a predetermined line out of the image data; and
   a differential profile creating unit for creating a differential profile by differentiating the line profile,
   wherein the area measuring unit detects edge positions around the pattern at a predetermined interval; and calculates the area of the pattern by subtracting a total area of trapezoidal regions each being defined by the two detected edge positions adjacent to each other and excluding partial patterns obtained by dividing the pattern, from a total area of trapezoidal regions each being defined by two detected edge positions adjacent to each other and including the partial patterns, and
   wherein the area measuring unit detects the edge positions around the pattern at the predetermined interval: by detecting and defining a first edge position of the pattern as a starting-point edge position; by detecting and defining a second edge position at a predetermined distance away from the starting-point edge position as a temporary edge position; by detecting a third edge position by use of the line profile and the differential profile on a line perpendicularly passing the middle point on a segment connecting the starting-point edge position and the temporary edge position; and by detecting a new edge position adjacent to the third edge position while defining the third edge position as the new starting-point edge position.

4. A pattern area measuring method to be executed by a pattern dimension measuring apparatus provided with a unit for irradiating an electron beam onto a sample in a scanning manner, a unit for acquiring image data of a pattern according to the quantity of electrons emitted, by irradiation of the electron beam, from a surface of the sample where the pattern is formed, a line profile creating unit for creating a line profile to represent a luminance signal on a predetermined line out of the image data, and a differential profile creating unit for creating a differential profile by differentiating the line profile, the method comprising the steps of:
   acquiring an image of a pattern in a measurement target range;
   dividing the pattern into a plurality of partial patterns;
   calculating the areas of the partial patterns; and
   calculating the area of the pattern by summing up the areas of the partial patterns,
   wherein, when the pattern is a rectangular pattern surrounded by opposed first and second edges, the step of dividing the pattern into a plurality of partial patterns further comprises the steps of:
     dividing the pattern into rectangular partial patterns by sectioning the opposed first edges into a predetermined length;
     creating the line profile on a line being parallel to the opposed second edges and intersecting the opposed first edges for each of the rectangular partial patterns;
     creating the differential profile by differentiating the line profile; and
     calculating the distance between the first edges by detecting the position of the first edges in each of the partial patterns by use of the line profile and the differential profile.

5. The pattern area measuring method according to claim 4,
   wherein the line profile on the line is created by averaging a predetermined number of pixel data corresponding to the predetermined length.

6. A pattern area measuring method to be executed by a pattern dimension measuring apparatus provided with a unit for irradiating an electron beam onto a sample in a scanning manner, a unit for acquiring image data of a pattern according to the quantity of electrons emitted, by irradiation of the electron beam, from a surface of the sample where the pattern is formed, a line profile creating unit for creating a line profile to represent a luminance signal on a predetermined line out of the image data, and a differential profile creating unit for creating a differential profile by differentiating the line profile, the method comprising the steps of:
   acquiring an image of a pattern in a measurement target range;
   dividing the pattern into a plurality of partial patterns;
   calculating the areas of the partial patterns; and
   calculating the area of the pattern by summing up the areas of the partial patterns,
   wherein the step of dividing the pattern into a plurality of partial patterns further comprises the steps of:

detecting and defining an edge position of the pattern as a starting-point edge position, and detecting and defining an edge position at a predetermined distance away from the starting-point edge position as a temporary edge position;

creating the line profile on a line perpendicularly passing the middle point on a segment connecting the starting-point edge position and the temporary edge position;

creating the differential profile by differentiating the line profile;

detecting a third edge position by use of the line profile and the differential profile;

detecting edge positions around the pattern by defining the third edge position as the new starting-point position, and by detecting a new edge position adjacent to the third edge position; and dividing the pattern into trapezoidal regions each defined by two edge positions adjacent to each other and including partial patterns obtained by dividing the pattern, wherein the step of calculating the area of the pattern is the step of subtracting a total area of trapezoidal regions excluding the partial patterns from a total area of the trapezoidal regions including the partial patterns.

* * * * *